Feb. 22, 1938. W. J. MILLER 2,109,028
PROCESS AND INSTALLATION FOR MAKING POTTERY
Filed Nov. 4, 1931 11 Sheets-Sheet 1
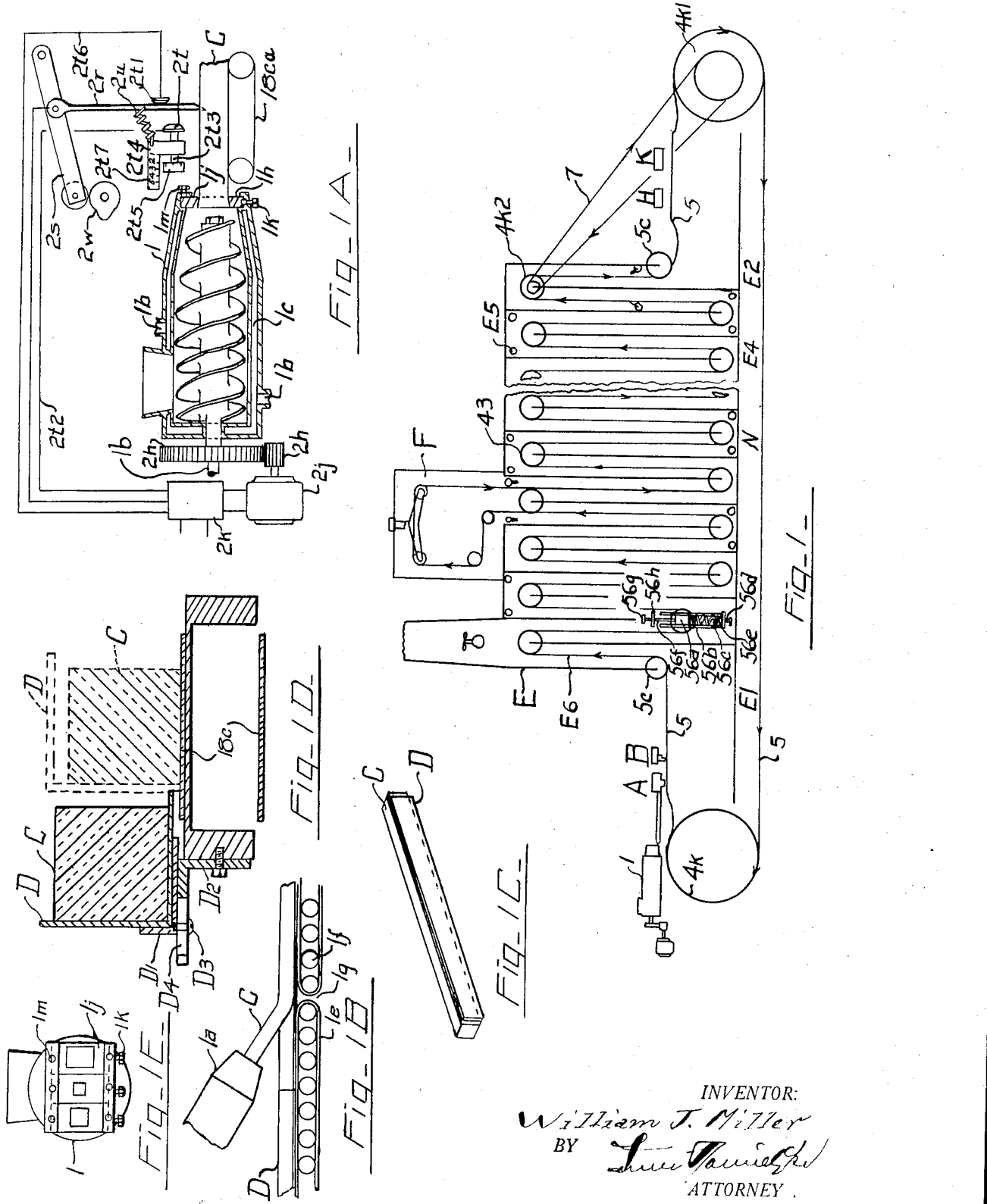
INVENTOR:
William J. Miller
BY
ATTORNEY.

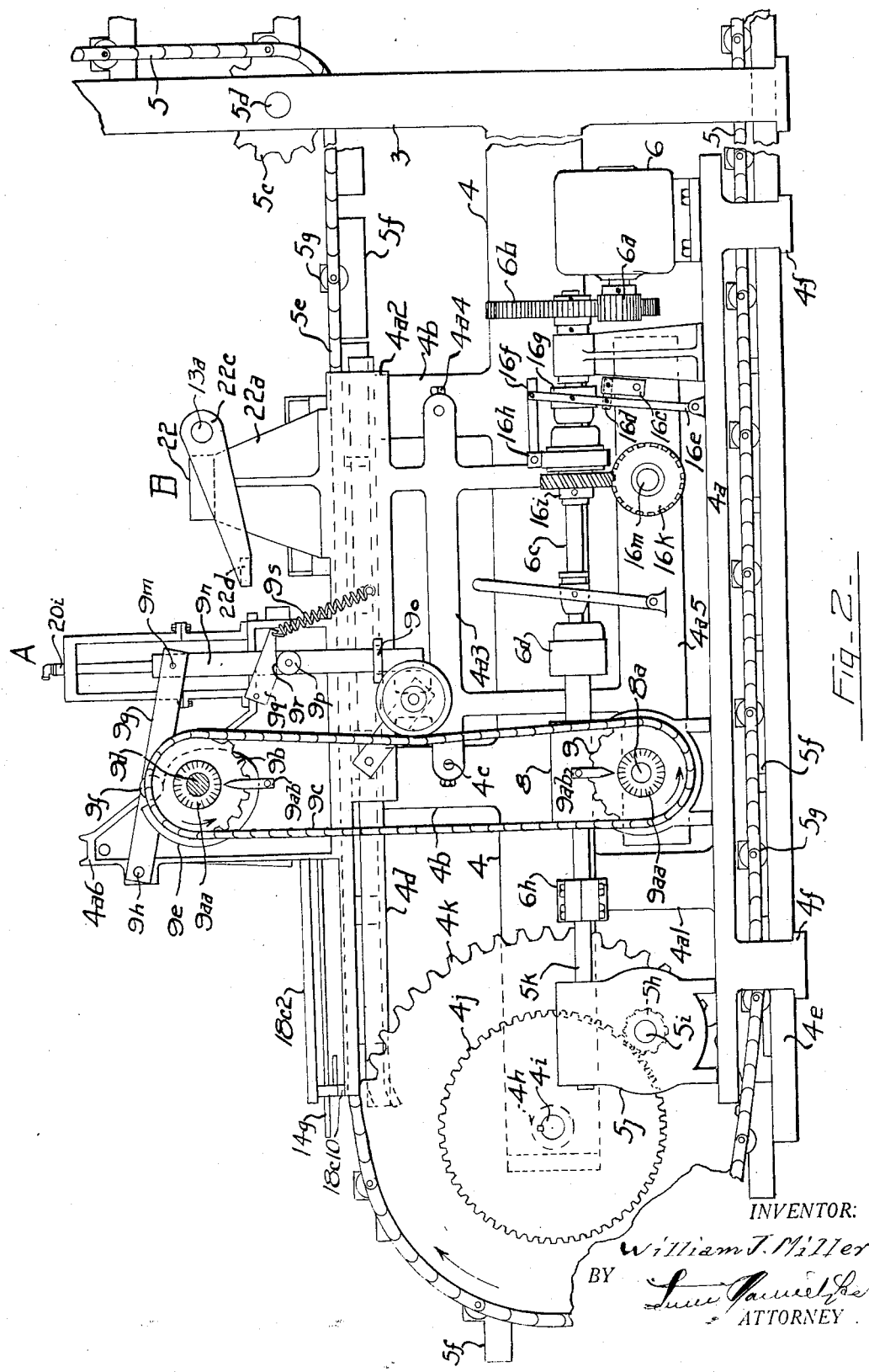

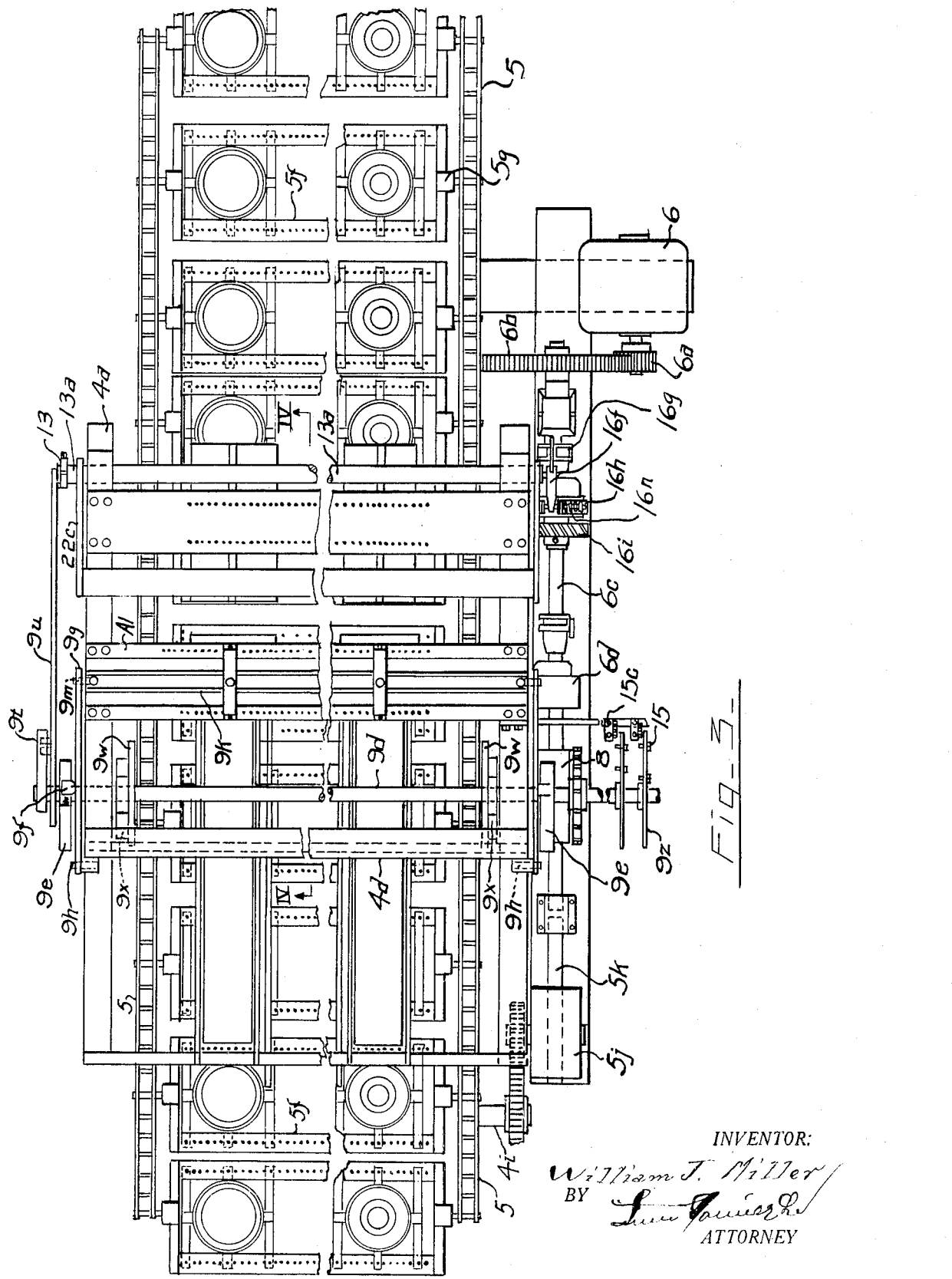

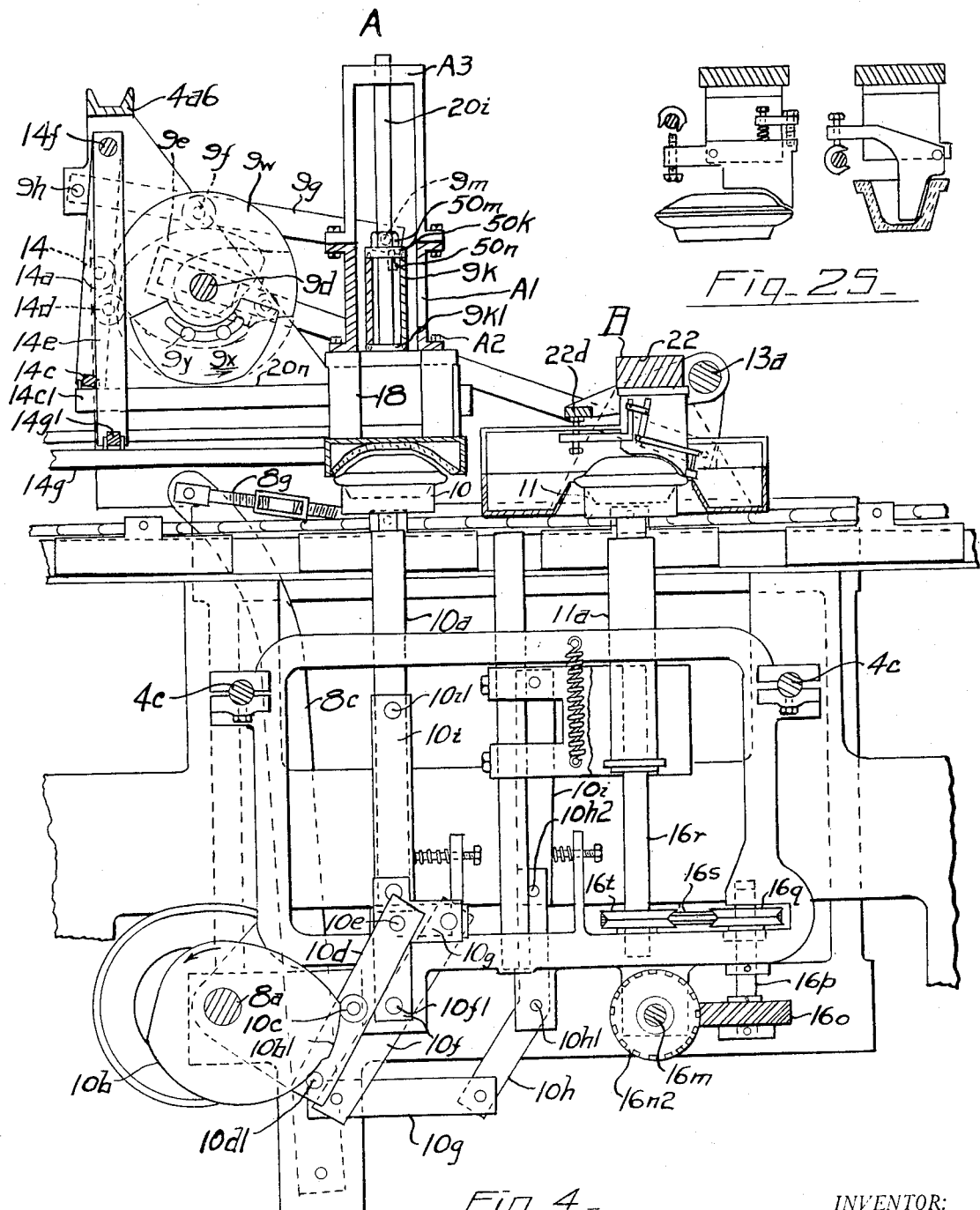

Feb. 22, 1938. W. J. MILLER 2,109,028
PROCESS AND INSTALLATION FOR MAKING POTTERY
Filed Nov. 4, 1931 11 Sheets-Sheet 5
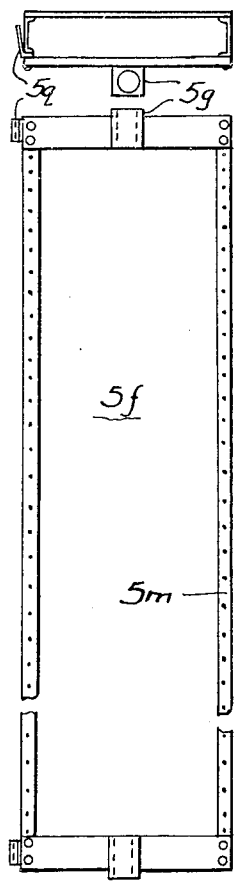
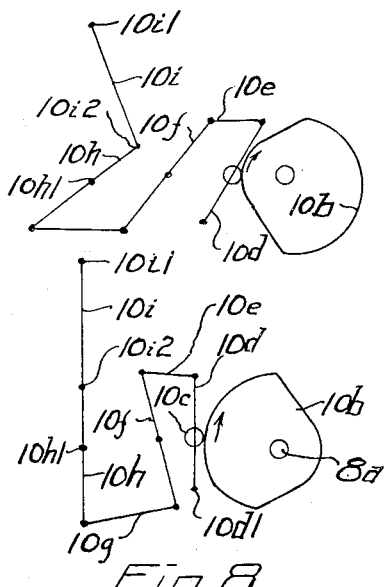
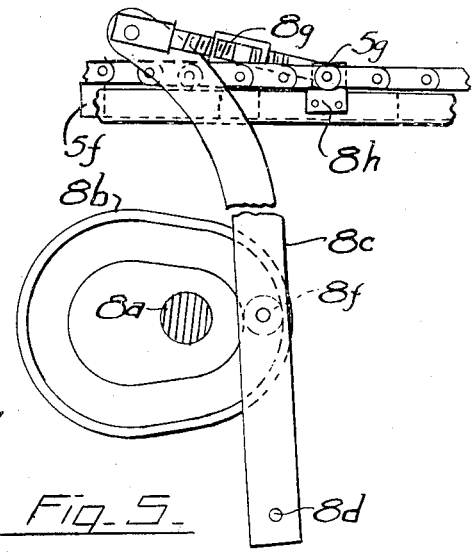
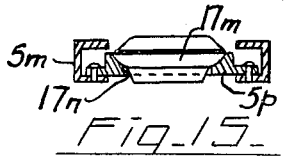
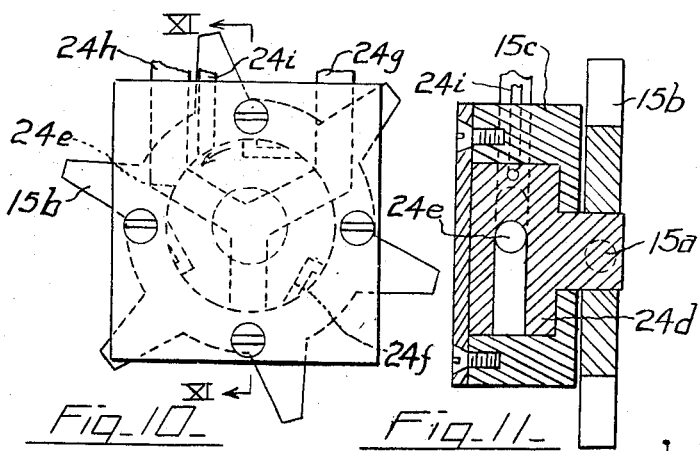
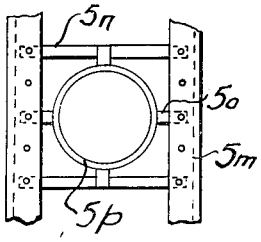
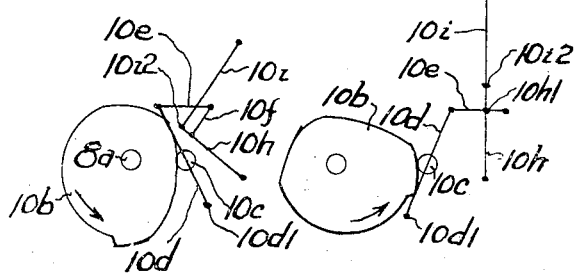
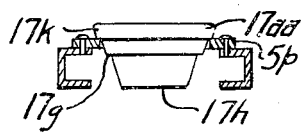
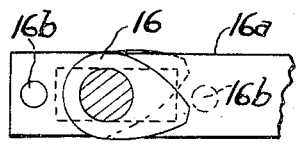
INVENTOR:
William J. Miller
BY
ATTORNEY

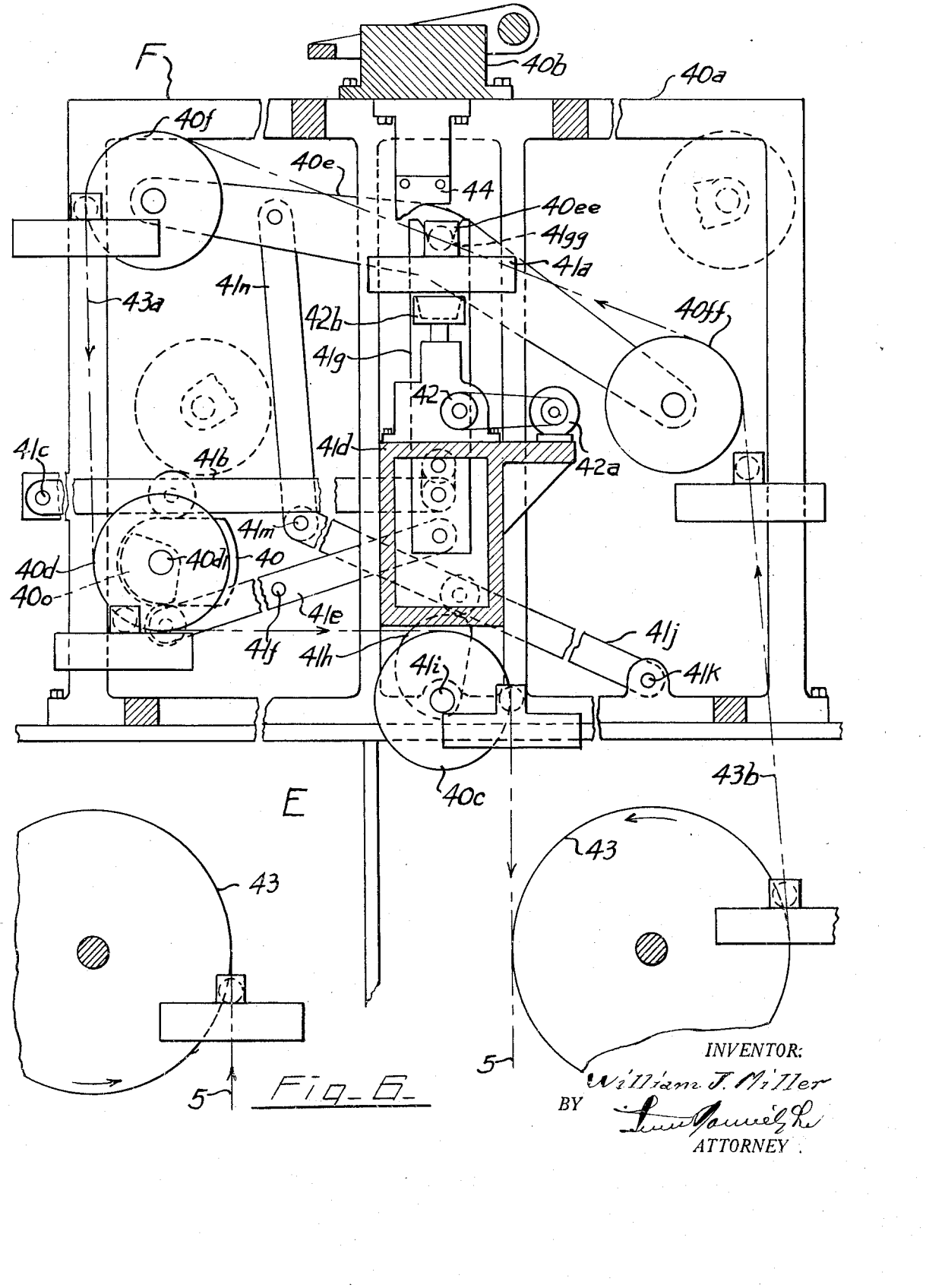

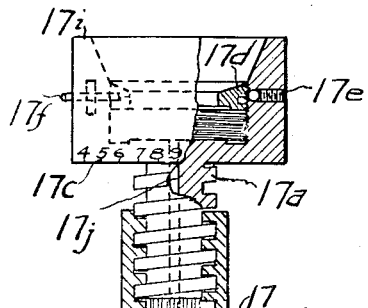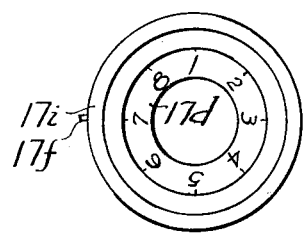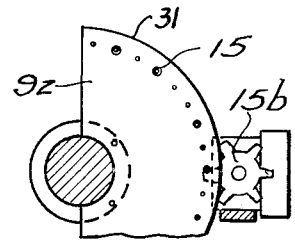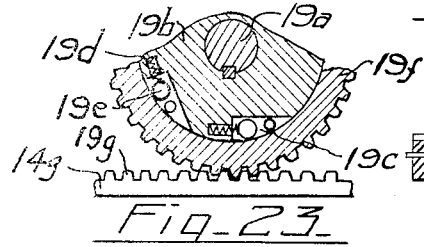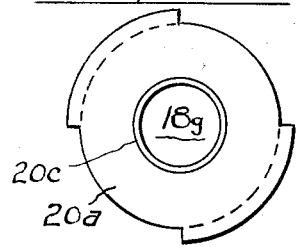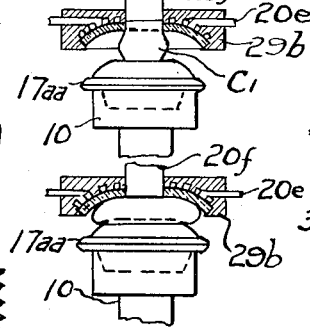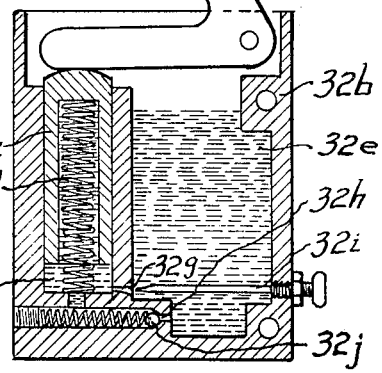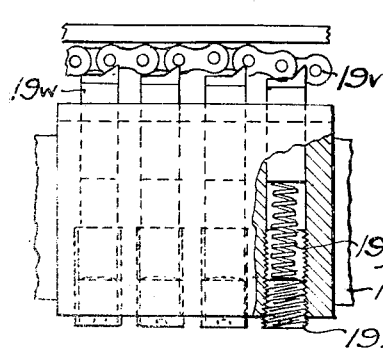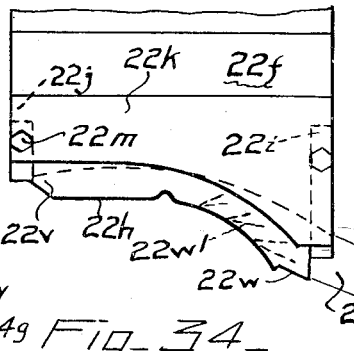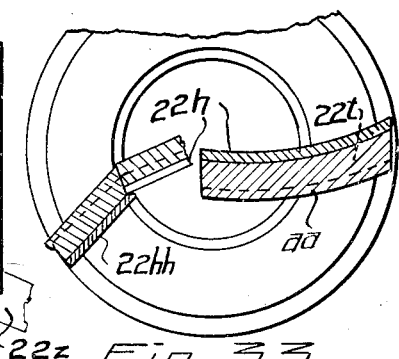

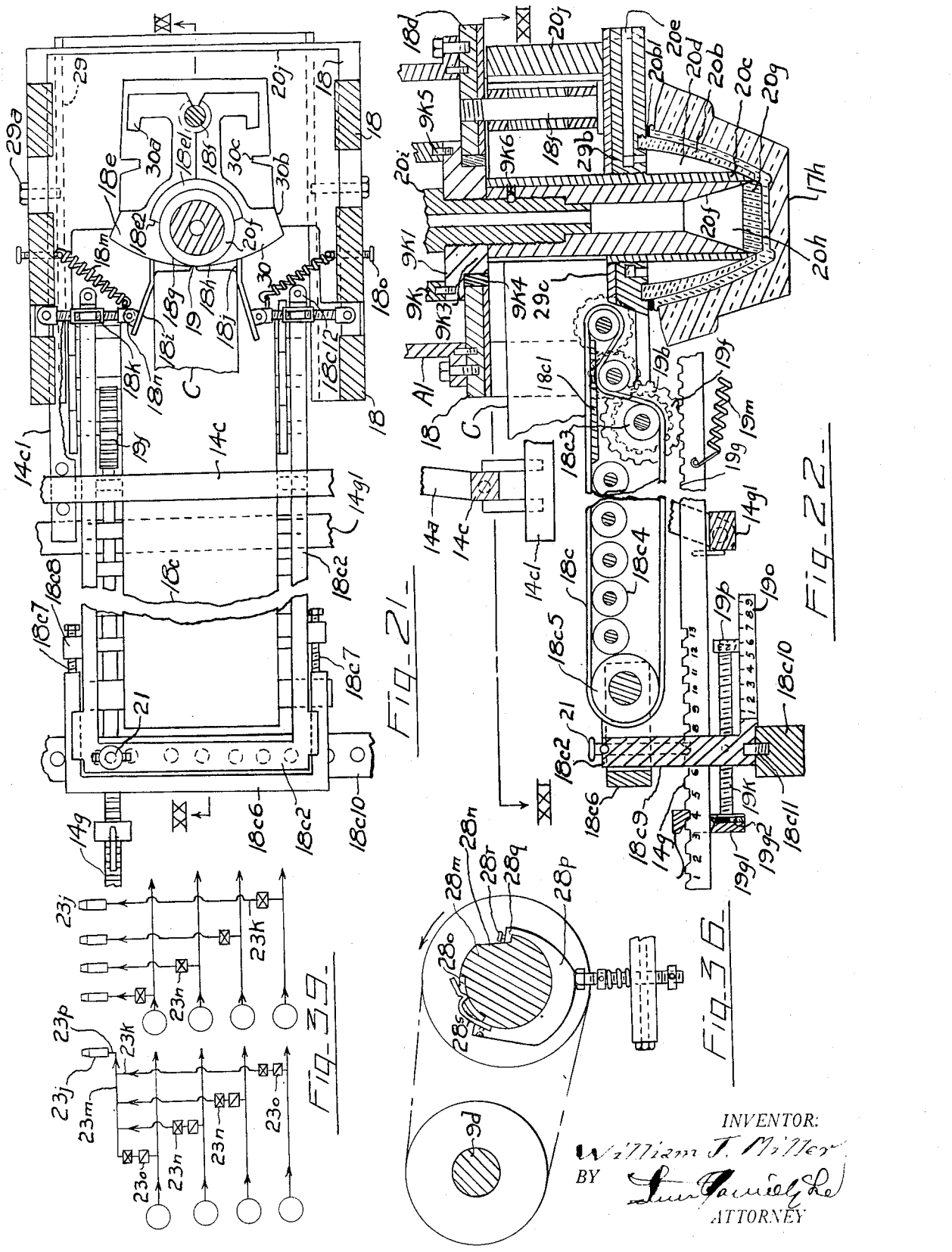

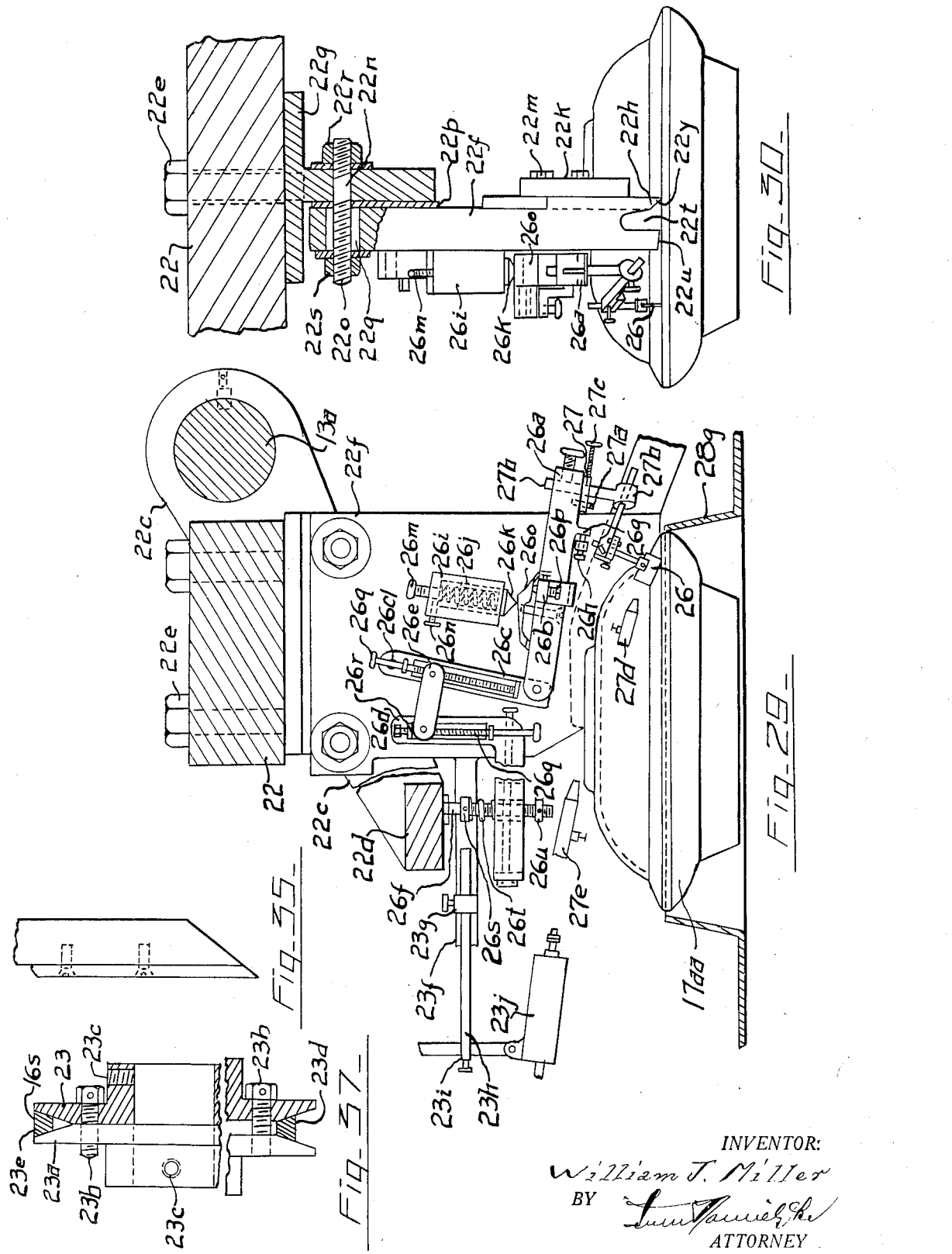

Feb. 22, 1938.   W. J. MILLER   2,109,028
PROCESS AND INSTALLATION FOR MAKING POTTERY
Filed Nov. 4, 1931   11 Sheets-Sheet 10
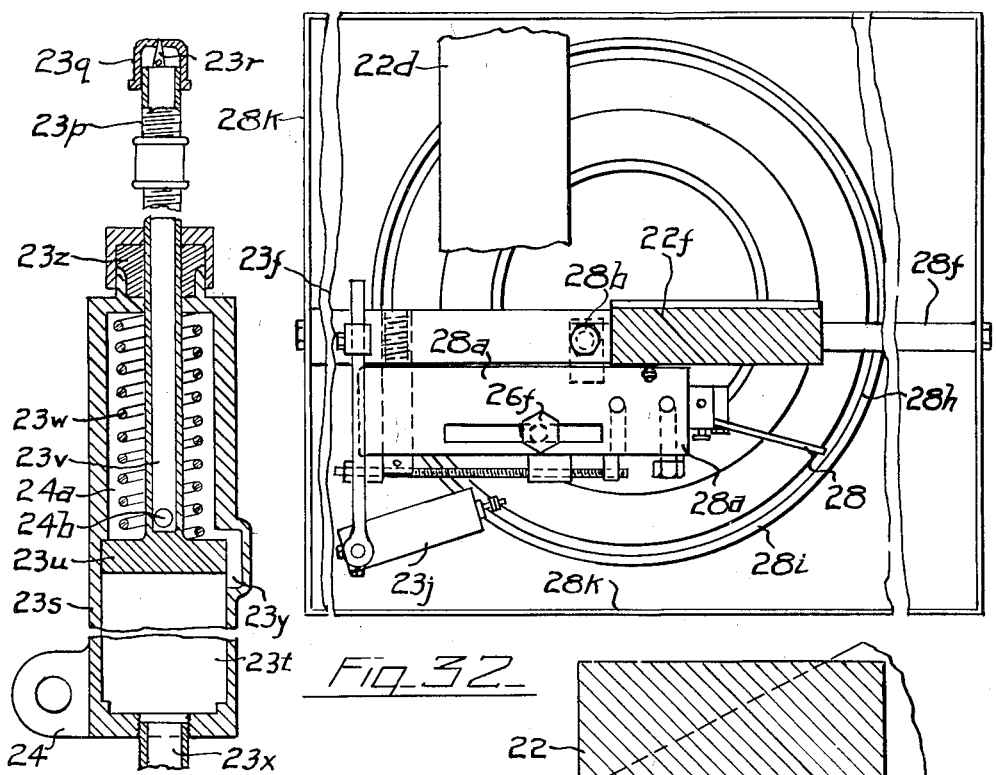
Fig. 40.
Fig. 32.
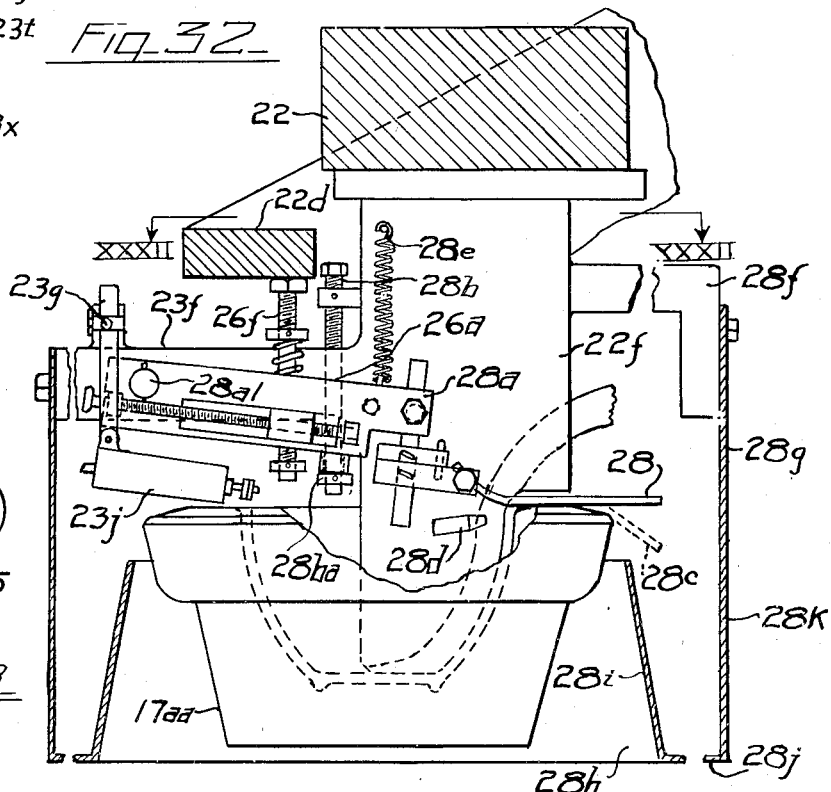
Fig. 38.
Fig. 31.
INVENTOR:
William J. Miller
BY
ATTORNEY INVENTOR:
William J. Miller
BY
ATTORNEY.

Patented Feb. 22, 1938

2,109,028

UNITED STATES PATENT OFFICE 2,109,028

PROCESS AND INSTALLATION FOR MAKING POTTERY

William J. Miller, Swissvale, Pa.

Application November 4, 1931, Serial No. 573,017

75 Claims. (Cl. 25—2)

This invention relates to methods and apparatus for manufacturing pottery ware, particularly plates, cups, saucers and kindred shapes from clay and has to do particularly with improvements in processes, installations, mechanisms, and apparatus, for the manufacture of pottery ware.

This application is a continuation in part as to all divisible subject matter of my application for United States Letters Patent Serial No. 343,693 now matured into United States Letters Patent No. 2,046,525. In my French Patent No. 701,108 and my Dominion of Canada Patent No. 342,561 and my United States Letters Patent No. 2,046,525 there are described processes and equipment for the manufacture of pottery ware on mass production lines from the clay mass to the formed ware ready for the firing kilns, all the operations being mechanical without requiring the clay or ware to undergo any manual operation or even to be touched by human hands. The numerous instrumentalities of this equipment, moreover, are capable of adjustment, interchange, or both, mostly without arresting the general operation of the equipment, giving great flexibility in the quantity and variety of ware produced and allowing the production to be effected economically under the most varying requirements ranging from large output of a few staple kinds of ware, to relatively small orders of many ware varieties.

The present invention relates more particularly to further improvements in the mass production of pottery ware along the general lines described in my said copending application, and which may be associated with or substituted for corresponding steps in the processes or corresponding apparatus in the equipment described therein, but which are capable of independent use.

The main objects of the present invention will now be outlined as follows:

To produce high grade jiggered pottery ware fully automatically from preformed slugs of conditioned clay.

To prevent damage to the porous molds due to temperature inequalities between the same and the clay applied thereto.

To prevent sweating of the clay during drying.

To produce simultaneously a multiple of shapes, sizes and styles of said ware.

To form clay gobs or mold charges of measured bulk which may be varied while continuing production.

To produce pottery ware in a multiple of types of clay simultaneously and provide for quickly changing from one clay to another without interrupting production.

To maintain a predetermined bulk of clay in the blank or semi-formed ware and to provide for quick alteration in a known degree of this bulk without interrupting production.

To adjust in a known degree the thickness of the blank without altering its bulk and without interrupting production.

To feed the clay to molds with substantial avoidance of inclusion of air and other foreign substances in the clay, and mastication thereof, after the clay has been once conditioned.

To provide for very rapidly spreading the charge over the mold and at a gradually increasing pressure and a high terminal pressure; and to avoid or considerably reduce undesired yielding of the latter pressure.

To effect more dependable release of the blank from the forming die.

To provide quick location in accurate position of the ware forming dies and profile tools and means for varying the distance between dies and profiles to a predetermined extent.

To provide for quick adjustment and interchange of the ware profiling and other forming tools and accessories.

To provide a common source of fluid supply in the various steps of manufacture while permitting adjustment of application in the individual steps.

To effect immediate removal of trimmings of clay to preferred points of deposit during ware forming operations.

To convey surplus clay removed from the ware surface, away from the profile tool to beyond the brim of the mold.

In the circulation of ware molds on a conveyor, in a closed cycle through fabricating stations, to provide for automatic take-up of slack in the conveyor at predetermined places.

In the circulation of ware molds on a conveyor in a closed cycle through fabricating stations, to halt temporarily an element of the conveyor while maintaining the adjacent conveyor elements taut.

Other objects and advantageous features of my invention are shown and described in the accompanying drawings wherein like characters of reference designate corresponding parts and wherein:

Figure 1 is a diagrammatic view of a complete installation including slug preparation and ware formation units, and a dryer; the dryer showing an extra forming unit on the top and also mechanism for regulating conveyor chain slack. Fig. 1A is a sectional and diagrammatic elevation of an intermittent pug mill for supplying clay, heated if desired, to the feeder conveyors; Fig. 1B is an elevation showing a pug mill extruding directly onto angles; Fig. 1C shows the angle containing a slug of clay; Fig. 1D shows a quick method of positioning the slug on the feeder conveyor; Fig. 1E is a front view of the pug mill.

Fig. 2 is a side elevation of the complete machine for forming ware;

Fig. 3 is a plan view of the machine;

Fig. 4 is a sectional view in elevation on line IV—IV of Fig. 3;

Fig. 5 shows a view of the mold tray advancing lever and cam;

Fig. 6 shows a ware treating unit which is mounted on the dryer;

Figs. 7 and 8 are diagrammatic views of cam and toggle mechanism for raising the mold chucks;

Fig. 9 shows a cam drive used on the jigger brake and trimmer;

Fig. 10 is a plan view of a water valve;

Fig. 11 is a sectional view of Fig. 10 on line XI—XI;

Fig. 12 shows a plan and end view of a mold tray;

Fig. 13 shows a deep ware mold positioned on a tray;

Fig. 14 shows a plan view of the mold seat on a tray;

Fig. 15 is a flat ware mold positioned on a tray;

Fig. 16 shows the chuck structure in detail;

Fig. 17 is a plan view of Fig. 16;

Fig. 18 is a side elevation of mechanism which operates the water valve;

Fig. 19 is a plan view of Fig. 18;

Fig. 20 is a sectional elevation of a cam shaft buffer;

Fig. 21 is a plan view partly in section showing details of the feeder station;

Fig. 22 is an elevation partly in section, corresponding to Fig. 21;

Fig. 23 shows a detail of the feeder belt drive;

Fig. 24 shows a clay gob being pushed out of the jaws by which it was severed from the slug;

Fig. 25 shows methods of mounting the profile for cup and saucer;

Fig. 26 shows in plan and section a ¼ turn thread connection;

Fig. 27 is a detail of the feeder belt drive;

Fig. 28 shows two views of the clay charge being extruded and preformed on a porous mold;

Fig. 29 is a side elevation of a profiling and trimming unit for shallow ware;

Fig. 30 is an end view of Fig. 29 from right to left;

Fig. 31 is a side elevation of a profiling and trimming unit for deep ware;

Fig. 32 is a plan view of Fig. 31;

Fig. 33 is a plan view of a curved and angular profile tool;

Fig. 34 is an elevation of a profile tool;

Fig. 35 shows a conventional profile tool;

Fig. 36 shows a removable cam;

Fig. 37 shows an adjustable sheave used in driving the jigger spindle;

Fig. 38 shows a universal clamp employed for mounting some of the forming tools and appliances;

Fig. 39 is a diagrammatic view of the water system;

Fig. 40 shows the construction of the water nozzles;

Figure 41:
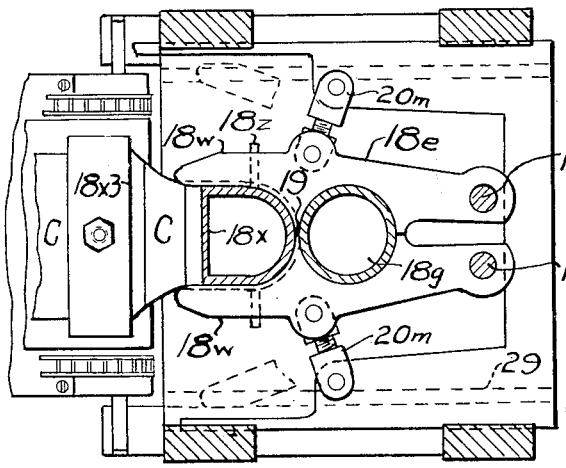
Figs. 41, 42, 43, 44, 45 and 46 show modifications of details of the charge feeding station.

In general outline, the complete installation for the manufacture of pottery according to the present invention consists of: pug mills 1, 1a adapted to prepared slugs C of conditioned pottery clay, if desired heated, which slugs are deposited on angles D, Fig. 1C, of suitable material for enabling them to be handled; or extruded directly into the feeding apparatus as per Fig. 1A; a fabricating machine comprising a feeding station A, a profiling station B and a conveyor 5 for transporting a series of mold trays, suspended by trunnions from links of the conveyor chains, through these stations; a drier E through which the formed ware is passed either by the same or a different conveyor; and, if desired, further fabricating stations F, H, K, Fig. 1, arranged behind the drier in the direction of ware travel, or at an intermediate stage of the drier, or both. Each mold tray has a plurality of mold seats and the machine is adapted to fabricate simultaneously a corresponding number of different lines of ware.

The fabricating machine hereinafter described comprises two stations A and B as aforesaid, but these may be supplemented by further fabricating stations, for example, for take out or backing up at F, etc., finish and swabbing at H and take out at K when a more diversified production is required, as described in my French Patent No. 701,108. The feeding station A is adapted to receive elongated conditioned clay slugs and has devices, Fig. 1A, for automatically advancing the slug to a charge severing or segregating mechanism capable of great precision of charge measurement, a die for accurately forming and contouring the charge onto the mold, a plunger for delivering the measured charge on the mold under ideal conditions, and means for reliably releasing the charge from the die and plunger. The profiling or forming station B, according to the present invention, has an assembly of appliances including profile blade, trimmer, air and water nozzles, which can be interchanged as a unit while permitting independent adjustment of all the appliances.

The invention is hereinafter described under the following topical heads, viz.: (1) The preparation of the clay slugs, (2) general description of the driving mechanism for the mold conveyor and forming units, (3) the feeder and preforming station, (4) the forming or profiling station, (5) the drier, and (6) modifications of the various devices and details thereof.

*Preparation of the clay slugs*

In the making of pottery ware, it is desirable to apply the charge of plastic clay securely to the mold in the form of a batt or blank or preshaped form of the correct volume, contour, thickness, diameter, and condition, so as not to involve any more work than necessary in further processing at a subsequent station and that the control of these factors should be reliable, convenient, and therefore as free from operation interruption as possible. For this purpose carefully conditioned clay slugs of uniform predetermined size and shape of cross-section are provided for feeding to the machine.

The clay is conditioned in the pugs and extruded onto retaining angles D, Fig. 1C, for insertion in the pottery forming machine to be fabricated into ware. These angles are preferably treated with a substance such as castor oil to reduce adhesion of the clay thereto but may be lined with a porous material such as felt to decrease adhesion. The pug mills, Figs. 1A and 1B, of the extrusion type, are provided with controllable connections 1b for conveying a heating medium such as steam, hot air, or electricity to chambers 1c in the shell of the pug mills and/or the interior of the same to raise and control the temperature of the extruded slug of clay, or the clay and water may be heated prior to insertion in the pug for a purpose hereafter explained. To provide for the making of multiple kinds and sizes of ware, each requiring a different quality of clay or size of extruded slug, I provide a plurality of pug mills in close proximity to the fabricating machine and each pug may be provided with a plurality of openings (Fig. 1E) for extruding slugs of different cross-sectional sizes and/or shapes. Also each pug may be fed with clay of different color, quality or condition.

The angles D serve to preserve the shape of the extruded slug C and provide for stacking the slugs without the clay slugs themselves coming in contact with each other due to the angles being larger than the slugs. The angles D also provide for transporting the slugs without distortion and applying in correct position and alignment, to the belts in the feeder station. The slugs and also the supporting angles D are made to a size suited to the size of the ware being made, thus, when a large charge is necessary, slugs of larger cross section are employed than when making small ware. The maintenance of cross sectional uniformity of the slug is of supreme importance as it provides for subsequent accurate segregation of charges having a uniform bulk. Also, the compacting of the clay by the pug orifice serves to eliminate cavities or other defects in the clay which might be reflected in the ware subsequently made. Any lapping or juncture marks in clay, prior to application, have a detrimental effect on the ware produced and it is desirable after slugs leave the pug orifice, to avoid any mastication or lapping over effect tending to produce lines of juncture.

A frame housing a series of belts 1e supported on rollers 1f mounted on anti-friction bearings, suitably supported in position under the pug orifices, serves to support the angles D to receive the relatively limber slugs as they emerge from the extruding orifices. To provide clearance for inserting and supplying empty angles D, I arrange the orifices of the pugs at the lower side of the casing.

The angles and deposited slugs are moved to the right (Fig. 1B) by the force of the extruded clay and to prevent distortion of the slugs by reaction of the angles, the belts 1e slope slightly downwards from the mouth of the pug mill. As all the slugs from a multi-orifice pug mill do not emerge at a uniform speed, each belt supports one slug only and is mounted on rollers independent of the others. A gap 1g between the belts facilitates cutting the slugs at the joints between the angles.

The slug sizes are also progressively stepped in height for each given width and the widths are also progressively stepped to thereby provide a slug having a cross-section best suited to the production of a compact charge when segregated. To avoid complication, a minimum number of slug sizes should be used.

To enable a single pug mill to deliver slugs of different cross-section, and for controlling the number of slugs extruded, the mill is provided, as shown in Fig. 1A, with interchangeable die members having orifices of different shapes and sizes. The mouth of the pug mill has a slot 1h, open at both ends, formed therein into which the orificed die 1j can be slidingly inserted. The die is located in the slot by means of a detent 1k, and gibs prevent the die from being pushed away from the pug casing by the clay. Screws 1m (only an upper screw shown) are provided in the outer lips of the slot 1h, which enable the die to be seated against the inner faces of the slot and also permit the pressure of the clay on the die to be relaxed when it is desired to change the die. This is effected by inserting the new die into the slot until it is in edgewise abutment against the die to be removed, and then pressing the new die into place with simultaneous ejection of the other die.

The slugs C thus deposited on the transportable angle supports D may be manually delivered to the charge segregating and feeding station A of the machine. One way of doing this is shown in Fig. 1D, in which the angle and slug are shown at the left, placed in a position alongside a conveyor belt of the feeder station, which position is definitely located by an angle guide D1 which can be adjusted on its support D2 by means of a screw D3 extending through a slot D4 in the support D2, to suit slugs of different width. The angle support D, and the slug C, are then merely tilted over into the position shown at the right of Fig. 1D in dotted lines, in which the slug is supported by the feed belt, and the angle then removed.

When making ware of a staple kind in which continuous production over a long period of time is desired, the slugs may be automatically fed in to the feeding station A by means which will now be described. An individual extrusion apparatus or pug mill, Fig. 1A, is mounted in front of each feed apparatus, see Figs. 21—22, and is arranged to extrude clay intermittently in amounts determined by computation or by previous practice directly into said feed apparatus.

A short idler belt 18ca or rollers to reduce advance resistance and support the slug may be interposed between the die 1j and the feeder jaws 18e. This belt 18ca takes the place of the feed belt 18c shown in Figs. 21—22 and subsequently described.

The pug mill 1 delivers the slug C directly onto the belt 18ca, this mill being driven by a motor 2j through gears 2h. The motor starter is controlled by a relay 2k.

An anchor 2r is provided, adapted to engage the slug and be moved thereby. This anchor 2r is pivoted on a lever 2s and its travel is defined by stops 2t and 2t1 forming contacts in the circuit of the relay 2k. A spring 2u urges the anchor 2r in the direction of the stop 2t in the motor starting branch 2t2 of the relay circuit, which spring is tensioned by the slug as it advances to the right. The stop 2t can be adjusted longitudinally with respect to the stop 2t1 in order to provide for adjustment of slug advance and size of charge or gob, for which purpose the stop is mounted on a screwed rod 2t3 cooperating with threaded guide 2t4 and has an indexed operating head 2t5 and scale 2t7. The other stop 2t1 may be fixed and it is connected in the motor stopping branch 2t6 of the relay circuit. The anchor 2r is raised by a cam 2w.

The operation is as follows: The anchor 2r is raised from the slug by the cam 2w whereupon the spring 2u moves it against the stop 2t which energizes the motor starting branch of the relay circuit and causes the motor to start and a slug to be extruded by the pug mill 1 onto the belt 18ca. As the slug advances it carries the anchor 2r against the stop 2t1 thereby energizing the motor stopping branch of the relay circuit and stopping the motor. The jaws 18e then pinch off the gob. The motor remains stopped until the cam 2w again actuates the anchor and initiates another cycle. The cam 2w is driven from the machine drive in suitably timed relation with respect to the operation of the jaws 18e. I thus directly measure the slug advance instead of slug support as shown in Figs. 21—22.

The purpose of heating the clay will now be explained. In making pottery as now practiced, the plastic clay, when thrown onto the mold, is cold, viz., quite perceptibly below room temperature and very considerably below dryer temperature, so that when the ware reaches the dryer the clay sweats until it absorbs enough heat from the surrounding air to nearly equalize that of the surrounding air. Evaporation however always keeps the damp ware below dryer temperature. The thermal shock of suddenly applying a cold batt (at about 60° F.) to a hot mold (at about 135° F.) tends to cause hair line cracks in the plaster mold surface due to rapid contraction, which is called mold crazing. To bring this cold clay to nearly dryer temperature and evaporate the sweat off the surface requires considerable time which in a chain dryer requires more molds, increased length, more power to move, and more drying air. The increased length of time the mold surface is saturated results in shorter mold life due to rotting which progresses during saturation only.

All these disadvantages are overcome by applying uniformly preheated charges, with a minimum of intermediate atmospheric exposure to the molds.

This improved method is impractical in present manual jiggering practice, unless the customary spasmodic manual delivery of large clay slugs to the jiggerman, resulting in intermediate progressive surface cooling and drying of the slug and consequent non-uniform viscosity and temperature of the charges is avoided.

By heating the clay to say 135° F. or higher, the ware immediately after formation, is in condition for dehydration with consequent advantages of quick dewatering of the mold, expedited drying, elimination of thermal shock to the mold. This increases the life of the molds and reduces the floor space, cost and upkeep of the drying equipment.

*Driving mechanism of conveyor and forming units*

The mold conveyor and the fabricating units of the machine are mounted in a frame comprising a main frame casting and a secondary frame casting. The main frame casting consists of longitudinal members 4, a base 4a, brackets 4a1 spacing the base from the longitudinal members 4, brackets 4b extending upwardly from the members 4, and feet 4f, all these parts forming an integral casting. Cross bars 4c having bearings in the brackets 4b sustain the secondary frame casting 4a2, which has a middle horizontal member 4a3 secured to the cross bars by means of screws 5a4, a lower horizontal member 4a5, and an upper bracket portion 4a6. Upper tracks 4d and lower tracks 4e for the mold trays are mounted on the brackets 4b and feet 4f respectively. The main frame members 4 are provided with bearings 4h supporting a shaft 4i to which a gear 4j and a pair of sprockets 4k are secured. At the right hand end, the frame members 3 are provided with bearings supporting a pair of sprockets 5c secured to a shaft 5d. Two chains 5 carrying the trays 5f are in engagement with sprockets 5c and 4k and are supported intermediate thereof by the trunnions 5g of the trays. The trays are in sliding engagement with the tracks 4d and 4e. The chains extend through the drier and fabricating stations outside the forming machine as hereinafter described and are supported beyond the drier by another pair of sprockets 4k1 (Fig. 1). The gear 4j is in engagement with pinion 5h rotated by a shaft 5i and a worm gear drive 5j driven by a shaft 5k. A motor 6 supplies power and transmits its motion to the shaft 5k through gears 6a and 6b, a shaft 6c, and 6k and a clutch 6d, thus providing for continuous rotation of the sprocket 4k. A synchronizing chain 7, (Fig. 1) is provided to keep the sprockets 4k1—4k2 in step and maintain the slack therebetween constant notwithstanding the excess slack in the other portion of the conveyor chains. The trays 5f (Fig. 2) are hung above their center of gravity by their trunnions 5g so they will be maintained in a horizontal position regardless of direction of travel of chain 5. The shaft 6c, in addition to driving the conveyor sprockets, also drives the device for actuating the mold trays in the slack portion of the mold conveyor, which is more fully described and claimed in my British Patent No. 293,023. For this purpose the shaft 6c is connected by worm gearing 8 to a cross-shaft 8a carrying a pair of cams 8b (Fig. 5) which cams oscillate levers 8c pivoted to the frame at 8d, rollers 8f on the levers engaging the operative cam track.

The levers 8c have at their upper ends adjustable pawls 8g making intermittent contact with the trunnions 5g on the right hand stroke of the levers only and trailing idly as the levers move to the left, thus providing for shifting some of the trays intermittently to the right in the course of the general advance of the chain and trays over sprockets 4k and 5c. A suitable rest 8h is provided to temporarily and yieldingly maintain the trays and chain in shifted position during the idle movement of pawls 8g.

As the trays are shifted to the right, slack accumulates to the right of the shifted tray and is dissipated or absorbed to the left of the tray due to the synchronous travel of sprockets 4k, 4k1 and 4k2. The conveyor chain 5 can be extended to the right and/or left of the machine to any desired point while maintaining the mode of operation described.

To compensate for conveyor chain length variation and wear, I provide an adjustable guide pulley structure which is shown located near the front end of the dryer E. (Fig. 1). One of the lower tier of guide pulleys is provided with bearings 56a which are loosely guided by a fixed channel 56b. A spring 56c inserted between the bottom of the bearing 56a and a fixed abutment 56e supports part of the weight of the pulley structure and a screw 56d determines the extent of said support. This arrangement provides automatic takeup and also partly or completely eliminates the catenary or slack section 5e in advance of the trays and determines the tension of the chain at that point. A stud 56f and nut 56g secured in the bearings 56a and sliding freely in a fixed abutment 56h provides for limiting the descent of the idler, thus adjustably determining the extent of the catenary, or slack elimination, or slack remaining at that point.

The cross shaft 8a, Fig. 2, is also used to drive the fabricating units of the machine, for which purpose a sprocket 9 is secured to shaft 8a and transmits motion through a chain 9c to a sprocket 9b, driving a shaft 9d to which are secured cams for operating the various implements positioned above the trays which will be described later.

The shaft 8a has secured thereto various cams for actuating the chuck devices located beneath the trays, see Fig. 4. To provide for eliminating resiliency in the elevation of the chucks 10 and 11, secured to shafts 10a and 11a, a toggle mechanism diagrammatically illustrated in Figs. 7 and 8 and detailed in Fig. 4 is provided.

This toggle mechanism also exerts progressively increased terminal elevating force on the chucks, and a smoother, slower, and more accurate terminal movement.

A cam 10b on shaft 8a oscillates a lever 10d pivoted at its lower end on a fulcrum 10d1 and carrying a roller 10c engaging the cam. The upper end of this lever 10d is jointed by a link 10e to a lever 10f connected by suitable joints 10g, which differ somewhat in the two forms shown in Figs. 7 and 8, to one of the toggle levers 10h, pivoted medially on a fulcrum 10h1. The other toggle member 10i is jointed at its upper end 10i1 to the chuck stem 10a or spindle 11a and at its lower end 10i2 to the toggle lever 10h, this joint constituting the knee of the toggle. The parts are so arranged that in one condition shown in Figs. 7 and 8, the toggle members 10h, 10i and the chuck stem are in alignment providing rigid vertical support for the chuck, while in the other condition the toggle parts are collapsed, corresponding to lowered chuck.

As it is of vital importance to insure against uncontrolled resiliency to obtain accurate terminal elevation to the chucks 10 and 11 as will be explained later, the toggle mechanism, due to the elements thereof being in compression and not subjected to bending strain, provides a simple but efficient solution. As the cam 10b is rotated, the chucks 10 and 11 are caused to reciprocate in synchronism with the movement of the chain 5e, the shifting mechanism Fig. 5 and the cam shaft 8a.

The shaft 8a has also adjustably secured thereto, two cams 16 (Fig. 9) serving to reciprocate a pitman 16a through the medium of rollers 16b, one roller and one cam being located and projecting from opposite sides of the pitman 16a, for controlling the rotation of the chuck of the profile station B. The pitman is pivotally connected to an oscillating arm 16c (Fig. 2) which in turn is connected by link 16d to a lever 16e pivoted to the frame 4a at one end and to a pitman 16f at the other, and intermediately to a clutch sleeve 16g. The pitman 16f is tapered at its forward end (see Fig. 3) and projects between the halves or gap in a brake band 16h resiliently maintained by springs 16n in contact with the hub of a gear 16i which in turn engages a gear 16k (Fig. 2) secured to a shaft 16m. The halves of the brake band are spread by the pitman 16f when pitman 16a is moved to the left to thereby release the brake and simultaneously move the clutch sleeve 16g to engage the clutch and thereby connect shaft 6c to the gear 16i due to the free half of the clutch being secured to the gear 16i, thus the brake is released and the clutch applied in rapid sequence, almost simultaneously and vice versa.

The shaft 16m has also secured to it, a gear 16n2 (Fig. 4) meshing with a gear 16o secured to a shaft 16p to which is secured an adjustable sheave 16q which transmits motion to a spindle 16r through the medium of a V-belt 16s and adjustable sheave 16t. The spindle 16r is in splined-sliding engagement with the chuck spindle 11a and chuck 11 of the profiling station. As the pitman 16a is reciprocated, the chuck spindle 11a with the chuck 11 is caused to intermittently rotate and rest and the cams 16 are adjusted to synchronize the periods of rotation with that of the elevation of the chucks by the cam 10b and also, in synchronism with the tray shift and other operations for a purpose hereinafter more fully described.

In Figs. 3 and 4, the cam shaft 9d has secured thereto two cams 9e and which are in engagement with rollers 9f secured to levers 9g pivotally secured at 9h to the frame 4a at one end and at the other to a cross head 9k, pivoted at 9m for operating a plunger which feeds the clay charges to the molds. A guide bar 9n, Fig. 2, depends from the pivot 9m and is guided at 9o. A roller 9p is pivotally secured to 9n and a lever 9q is pivoted to the frame at one end and to a tension spring 9s at the other. A cam portion 9r contacts with the roller in such a way that when the crosshead 9k is in its lowermost position, the spring 9s exerts its maximum pressure, and, when the cross head is in its uppermost position, the lever 9g and cam portion 9r are substantially in a vertical position and exert no vertical pressure on the roller 9p and consequently the cross head 9k descends by gravity only at its upper end of travel, and under progressively increased spring power at its lowermost end of travel, for a purpose hereinafter more fully described. The shaft 9d (Fig. 3) has secured thereto a grooved cam 9t transmitting motion to pitman 9u and arm 13 secured to shaft 13a having bearing in the frame 22a and serves to oscillate said shaft 13a for operating the profiling and trimming appliances as hereinafter described. The shaft 9d also has secured thereto, cams 9w operating on a roller 14 (Fig. 4) secured to lever 14a which in turn is pivoted to the frame 4a at 14f and at the other end to a cross bar 14c for operating slug severing jaws as hereinafter described. Cams 9x for the feed belt drive are adjustably secured to the cams 9w by screws 9y and contact with rollers 14d secured to lever 14e which in turn is pivoted to the frame 4a at 14f and at the other end connect with a cross bar 14g1 which actuates the pitmans 14g which in turn actuate the belt moving mechanism hereinafter described. The horizontal bar 14g1 serves to operate all the pitmans 14g to thus avoid the use of a separate cam and lever for feeding each slug. A fork secured to the pitmans 14g serves to operatively connect pitmans 14g and bar 14g1.

In Fig. 2, protractor dials 9aa are shown secured to the ends of the shafts 8a and 9d for the purpose of ascertaining and recording, for subsequent re-setting, the various cams on the cam shafts to thereby provide for predetermined setting of various functions of each separate mechanism to suit various types of ware and conditions of clay etc. obtained by previous tests. A pointer 9ab facilitates accuracy.

An adjustable coupling 6h connecting shafts 5k and 6c facilitates adjustment of the cam shaft 8a with that of the sprocket 4k to initially bring the chain slack and tray shift into synchronism.

To give adjustable spacing of the lines of ware fabrication, the trays 5f (Fig. 12) are provided with a series of dowel holes, evenly spaced in the flanges of the side pieces 5m, which holes match dowel holes in the cross bars of the machine on which the fabricating units are mounted, so that these units may be accurately positioned in alignment without tedious measurement and adjustment. The dowel holes in 5m serve to position cross bars 5n or lugs 5o (see Figs. 13, 14, and 15) which support and adjustably and accurately position, mold holding rings 5p. For convenience and economy in mounting various types of molds, the upper as well as the lower flanges of the channel sides 5m are perforated. To reduce the shock of impact of colliding trays, when slack is being accumulated, resilient members 5q are provided at the corners of the trays. For molds of large diameter, the bars 5n are spaced farther apart than when small diameter molds are mounted. This arrangement also provides for spacing the units to best advantage, that is to say, when small molds such as for cups and saucers are employed exclusively, then a greater number of units may be applied and the center distance or brim clearance of the molds spaced to best advantage, vice versa, when large molds are employed exclusively, a less number may be mounted, or as in the practical operation of this machine in dinnerware plants, the machine may be equipped with units, one to make cups, another saucers, another cereals, bread and butter plates, dinner plates, etc., so that at each functioning of the machine, one complete unit of a dinner set may be fabricated to thereby provide for synchronized production of dinner sets, (except pieces of irregular shape which have to be cast), without the necessity of storage of one article while another is being made. The coacting fabricating mechanisms hereinafter described are also provided with corresponding dowel holes preferably snug fitting dowels to avoid need of adjustment and the supporting bars therefor mounted to bring these holes in exact alignment with those of the trays to thereby provide for quick selective adjustable mounting of molds and fabricating units.

In Fig. 4, the feeder unit "A" is shown as secured to a frame girder A¹ by means of dowelled studs A², a series of holes being provided in girder A¹ (Fig. 3), similar to that shown in Fig. 2.

Figs. 16 and 17 show the preferred method of mounting the chucks 10 and 11, (Fig. 4) on the spindles 10a and 11a. The spindles are threaded preferably internally and provided with a positioning device such as a screw or detent 17, a stud 17a depends from the chuck and is externally square threaded and provided with a series of positioning flutes 17b into which the positioning device 17 is projected to retain the stud in angular position. The square threads on stem 17a have vertical lost motion in the hollow spindle 10a but are a snug sliding fit laterally so that a limited amount of free vertical travel of the stud 17a in the spindle 10a is provided for.

A spring 17a1 is adjustably positioned below the stem to maintain it elevated. During the pressing and profiling operations, this serves as an overload release and also to more gradually progress the mold to maximum elevation and in proportion to the resistance met from work being done. A stiff clay spreads and profiles slower than a more fluid clay. This therefore also compensates for variation in clay viscosity and provides for controlled resiliency of the chucks.

The chuck is also provided with a scale 17c visibly located, thus providing for adjusting and maintaining in adjusted position, the altitude of the chuck, which in turn controls the thickness of the batt or ware. The chuck is further provided with a bushing 17d externally threaded and in engagement with the interior threaded portion of the chuck, slots or flutes being provided in the periphery of the bushing 17d and a detent 17e provided in the chuck wall to maintain said ring in adjusted position. A scale on the bushing (see Fig. 17) provides a visible means of ascertaining the position of adjustment for a purpose hereinafter described. The ring 17d is preferably chamfered on the top or mold seating surface and a screen secured on the under side. The chamfer prevents dirt lodging thereon and also applies inward radial pressure to counteract the internal bursting pressure set up in the mold during the batt pressing operation.

In operation, these chucks reciprocate to raise the molds 17aa (Figs 13-15) off the mold supporting rings 5p into engagement with fabricating units and it is necessary to accurately position the mold with relation to the fabricating unit vertically and desirable and economical to make this adjustment while in operation. In actual operation, the speed of the machine will range between 6 and 12 pieces of ware per minute in each fabricating line depending upon the size of the ware being made, and the dwell period of the chuck in lowermost position equals about ⅓ of each cycle thus providing ample time especially if a detent is employed for adjusting the height of the chuck without stopping the machine. The chuck is further provided with a recess through its side, housing a gear 17f (Fig. 16) which engages the flutes or teeth of the ring 17d thus providing for adjustment of the position of said ring while in operation. When making ware employing molds having a cavity such as cup molds, it is desirable to support the molds at the bottom to prevent fracture of the intervening rather fragile plaster walls of the mold between the flanges 17g (Fig. 13) and the bottom 17h, due to pressure from the forming implements, this ring 17d (Fig. 16) therefore, provides for supporting the mold on the chuck brim 17i, or on the ring 17d, or on both. This arrangement may also be desirable when making large plates, wherein molds are employed such as shown in Fig. 15, to properly support the central portion of the mold. The chuck is further provided with a bore 17j for the purpose of conveying sub and/or super atmospheric pressure to the chuck cavity below the mold to either seize the mold or repel it from the chuck at definite instances to thereby insure more reliable functioning of the machine.

The mold in Fig. 13 is also provided with an upper flange 17k which provides for supporting the mold in the ring 5p without interfering with the seating of the chuck against the flange 17g. The mold Fig. 15 is supported on the mold ring 5p by the outer edge of the flange 17m, a gap 17n providing for access of the chuck.

Figs. 18 and 19 show the means for actuating the water valves, shown attached to shaft 9d, and adjusting the instant of actuation of the control cam. A cam disc 9z on the shaft 9d is provided with a series of threaded openings 31 into which a number of studs 15 are secured. These studs engage the arms of a star wheel 15b and shift it one notch or ⅛ revolution and as the valve requires a ⅓ revolution from one open to another open position, it follows that at every alternate functioning, the valve is opened and closed. These studs may be placed at various positions and serve for adjusting the relative instant of and number of functions of the fluid control valve during one cycle. The disc 9z is also adjustable on its shaft.

Fig. 20 is a sectional view of a cam motion stabilizing device. When cams having quick descent are employed, the tendency is for the shaft to leap ahead at that point to the extent the lost motion in the transmission gearing will permit, and this affects the functioning of other cams at that point. To overcome this tendency, one or more actuators 32k are provided rotating with the cam shaft and they are arranged to contact with a roller 32 pivotally mounted on a bell crank lever 32a pivoted to a casing 32b, the horizontal portion of the bell crank resting on a buffer piston 32c which is normally kept elevated by a spring 32d. Piston 32c is a close working fit in a bore 32f in the casing 32b and a reservoir 32e communicates with the piston bore 32f through ports 32g and 32h. A needle valve 32i controls the size of the opening 32g, and a ball check 32j prevents outflow of liquid from the bore 32f. When the reservoir 32e is filled with a buffer liquid, for example, oil or water, the bore 32f also fills, and when piston 32c is depressed, it resists to the extent that the valve 32i obstructs expulsion of liquid from the bore 32f. On the upward or idle travel of piston 32c, liquid passes freely past ball valve 32j. The actuator 32k is secured to the cam 32m or its shaft and is so mounted angularly and its contour is such as to equalize the reverse impulse imparted by the roller 32l against the quick drop surface of the cam 32m, and thereby stabilize the operation of other cams, on the same shaft.

*Feeder and preforming station*

When employing the transferring angles, Fig. 1C, the preferred form of belt structure for feeding the slugs is as shown in Figs. 21 and 22. Each slug feeder belt 18c which is endless and made of rubber covered non-resilient material, is mounted so the upper rim thereof is at a higher elevation than the surface of a platen 18c1 to thereby reduce or avoid contact and resistance to the advance of the projecting end of the slug and insure uniform and reliable advance. This platen may be hollow and have a porous upper face through which air under pressure can be forced to prevent adhesion or release the slug tip from the platen.

A rectangular frame 18c2 houses a series of drive rollers 18c3 for the belt, which is supported on idle rollers 18c4 and undulated over the rollers 18c3 which are of small diameter to provide ample traction in a minimum vertical space. The front belt roller 18c5 is mounted in a yoke 18c6 slidably arranged on the frame 18c2 and adjustable relatively thereto by means of screws 18c7 threaded in lugs 18c8 of the frame 18c2, for the purpose of keeping the belt taut.

A depending extension 18c9 of the frame 18c2 rests on a crossbeam 18c10 of the machine frame in which is fixed a series of spaced dowels 18c11. The feeder belt frames 18c2 have corresponding dowel holes whereby the frames can be easily and accurately located transversely of the machine in alignment with the devices with which the slug feeders cooperate. The other end of the belt frame 18c2 rests on a frame member 18 or base 92b hereinafter described, and is located by dowels 18c12 and dowel holes in like manner. One of the belt driving rollers 18c3 has secured thereto a spider 19b, Fig. 23, of a clutch mechanism. This spider is provided with wedge shaped recesses 19c in its periphery, housing rollers 19e pressed by springs 19d against the inner periphery of a ring gear 19f meshing with rack teeth 19g on the pitman 14g which is reciprocated from the cam mechanism 9x, Fig. 4. As the pitman 14g is reciprocated, the clutch mechanism causes the rollers 18c3 and consequently the belt 18c to be progressed forward, in one direction only, the rollers 19e trailing idly when the ring gear 19f rotates clockwise.

In Fig. 22, is shown a structure which provides for accurately adjusting the extent of progression of the belt 18c. The belt roller 18c3 is driven by a friction drive, Fig. 23, and the pitman 14g is guided in the frame member 18c9. A micrometer screw 19k is screw threaded in the frame member 18c9, its graduated head 19p cooperating with the fixed scale 19o. This screw 19k serves as stop for an abutment 19g1 on the pitman 14g. The pitman 14g is pushed to the left by the cam 9x and retracted by a spring 19m so that its travel termination to the left is constant and its travel to the right is adjustable. Presuming that one rotation of screw 19k advances the screw one graduation on scale 19o, it is evident that minute micrometer adjustments of the advance of the pitman 14g and consequently of the clay slug C may be made while the machine is in operation and by noting the position of the indicating dial and the scale 19o, and with a predetermined size slug on the belt 18c, the machine may be set to cut off extremely accurate weight charges initially without tedious experiment. Also, the weight may be increased or decreased to a known extent quickly and while the machine is in operation.

The abutment 19g1 with which the screw 19k contacts, is adjustably secured to one end of the pitman 14g, by means of notches in the pitman and a corresponding tooth on the abutment, a spring 19g2 holding the parts in engagement. This provides for quick major adjustments of slug advance. A scale on the rack indicates the position of the abutment.

To provide for discontinuing the feeding of clay to any unit, a latch 21 slidably socketed in the frame 18c2 is provided, which when thrown into engagement with a notch of the pitman 14g holds the pitman 14g in extended position and prevents progression of the clay.

Figs. 21 and 22 also show the preferred mechanism for segregating charges of clay from the preformed slug and delivering the charge to the mold. The frame member 18 is of open rectangular box-like construction and houses a pair of jaws 18e pivoted at 18f to the top portion 18d of the member 18. A vertical bore 18g extends through the jaws and the exterior entrance end 18h of the jaws are in the form of an arc having the center of the hinge or pivot pin 18f as a center. Bearing against this contoured surface 18h, are slug guides 18i serving to guide the slug C centrally to the bore 18g. These guides 18i have scraper ends 18j which bear against the contoured surface 18h of the jaws 18e and serve to scrape off any clay that might adhere to the face 18h and thereby prevent accumulation of clay at that point. The cutting edges 19 of the jaws 18e when in open position are substantially in alignment with the scrapers 18j so that all the clay will be scraped off and an unbroken surface provided for entrance of the slug C. The scrapers 18j are adjustably supported as by the adjustable link 18k which permits their angle of inclination relative to the slug sides and their extent of approach to each other, or slug clearance to be adjusted. The spring 18m serves to resiliently maintain the edge 18j against the jaw face 18h. The pivots 18n of the link 18k are in form of bolts to clamp the link in any desired position at one or both ends. The tension of the spring 18m is adjusted by screw 18o to thereby adjust the degree of pressure with which the scrapers 18j contact with the jaws 18e.

The guides 18i are preferably faced with a porous material over a chamber connected to a source of air at superatmospheric pressure through control valves, to repel slugs of adhesive nature from their surfaces to insure unretarded accurate advance of the slug.

However when clay of a less adhesive nature is being used, a highly polished, abrasive resistant face, such as chrome plate may be employed.

The jaws 18e are provided with lugs 30 and arms 30a, and are operated by means of a reciprocable yoke 20j driven through a sliding bar 14c1 from the cam 9w, lever 14a, and crossbar 14c (Fig. 4). This yoke has tapered ledges engaging tapered flanks of the jaw lugs 30 in the left hand movement of the yoke 20j, to close and lock the jaws, and dogs 30c which engage the jaw arms 30a in the right hand movement of the yoke, to open the jaws. The jaws are cut away at the side nearer the pivot 18f and a separate complementary member 18e1 corresponding in shape to the cut away portion is stationarily mounted in the frame 18 or as an extension of a bushing 20c, to prevent advance of the clay beyond the rear of the orifice. The mating edges 18e2 of the member 18e1 and of the cut away part of the jaws are circular to wipe off any clay which may be projected over the joint face.

As the jaws 18e close to sever a charge, the cutting edges 19 will displace some material to right and left. When extremely soft sticky clay is employed, it tends to sag against the jaw faces 18h and to adhere thereto.

Figure 46:
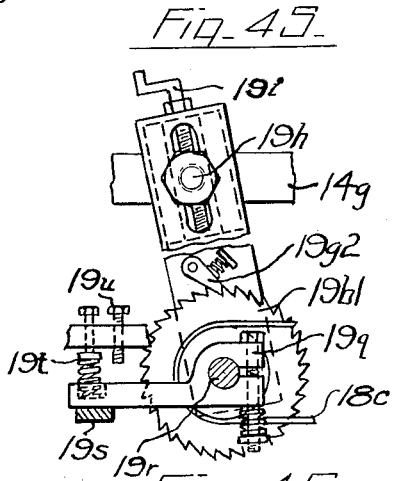

To avoid this I provide for simultaneously cutting and retracting the slug end away from the faces 18h as, in Fig. 46, I show a method of retracting the belt to a known extent as the jaws close. A lever 19q frictionally engages the shaft 19r, and at its other end on one side abuts against a stop 19s and on the other side against an adjustable spring 19t; a screw 19u adjustably limits the clockwise travel of the lever 19q. As the belt is progressed, the spring 19t is compressed and on the return movement of the pitman 14g, the spring 19t tends to reverse the direction of travel of the belt 18c to a known extent to thus retract the material away from the jaws 18e.

In Fig. 27, a modified form of retracting mechanism is shown. The belt 18c has secured to it a chain 19v which is advanced directly by pitman 14g through pawls 19w spaced to engage the chain links progressively, so that the slug is advanced positively to a known extent and the retraction is governed by the back pressure from the jaws aided by the degree of pressure of the inclined flanks of the pawls 19w against the links of the chain 19v, the degree of which may be adjusted through the screws 19x and the springs 19y.

Figs. 21 and 22 show, as an example, a preforming mechanism for bowls or cups. The frame 18 of the jaw mechanism is provided with a quickly removable base 29b (fully described later). A porous die 20b is cemented or otherwise removably secured in the die base 20a, Figs. 26-42, or directly in the base 29b encircling a sleeve 20c secured permanently in the base, a chamber 20d being provided between the die and the sleeve. A conduit 20e provides for conveying, under valved control, a fluid under substantial pressure to the chamber 20d. The die proper 20b is of porous material such as porous mixture of cement and sand, open structure bisque, etc. A plunger 20f provided with a porous face 20g is in telescopic engagement with the sleeve 20c and is provided with a stem 20i and chamber 20h communicating through control valves with a source of compressed air. Said stem 20i is adjustably secured to the cross head 9k (Fig. 2).

Fig. 22 also shows a structure for quickly interchanging the feeder plungers 20f in predetermined position and also for making minor adjustments. The upper portion 18d of the frame 18 is bored and provided with a guide bushing 9k4 bored to fit the largest diameter plunger of the series adaptable thereto. The plunger 20f is internally threaded and provided with a screw or detent 9k6 for adjustably securing it to the plunger stem 20i. A clamp bar 9k1 is secured to the stud and provided with a boss 9k2 which is a sliding fit in a bushing 9k4 and two dowels 9k5 are secured in the bar 9k1 and enter accurately spaced holes in the crosshead 9k aligned with the holes in the other supports heretofore described, serving to accurately position the plunger relatively to other apparatus without tedious adjustment. The parts 9k3 and 20f are provided with an index dial and pointer to visibly ascertain and record the adjustment, the detent 9k6 serving for quick adjustment while in operation. As shown in Fig. 4, the stud 20i extends up through another clamp bar 50k, nut 50m and key 50n. The narrow width of the bar 9k1 permits the quick removal of the entire assembly through the cross head 9k by simply loosening the nut 50m to clear the dowels 9k5, then rotating the assembly 90°. Also the upper guide bushing 9k4 is common to all diameters of plungers, therefore need not be exchanged. Thus the plunger may be adjusted correctly, before installation, from previous records, and delay in production is avoided.

Figs. 21 and 22, also show mechanism for quick interchange of dies. The floor of the frame 18 is cut away and the inner sides are provided with grooves 29 through which project detents 29a. The die base 29b is tongued at the sides to fit into the grooves 29 and on its upper surface provided with a wearing plate 29c. The ducts 20e connect through quickly removable couplings to the valves (Figs. 10 and 11). To replace a die, the plunger is elevated, the air connection is uncoupled and the die with its base is pulled out to the right or left and another die slipped into place and coupled up, and as the seatings are snug and accurately machined, instant alignment with the mold is assured. The detent 29a insures alignment and prevents accidental displacement of the die.

The operations of feeding and preforming are performed as follows: A slug of clay is placed on the belt 18c, the jaws 18e being open, the slug is advanced a predetermined distance beyond the cutting portions 19, and over the opening 18g (Fig. 21), the jaws then close, cutting off the projecting stub and also then tend to compress and form to partial cylindrical shape, the pinched off gob or piece of the slug. This compressing also serves to hold the gob and prevent it from falling out of the opening 18g prematurely. (See Fig. 24). The plunger 20f now descends, and simultaneously the mold is elevated, and the charge is progressively compressed and spread over the plate mold as shown in the lower two views of Fig. 28. The charge first contacts with the middle of the mold, then is gradually spread over the surface of the mold, progressively contacting with the surface thereof to an equal degree all around and pushing out any air in advance thereof.

The termination pressure is very high due to the gradual restriction of the space between the mold and die and is further accentuated by the circumferential final substantial closing of the gap between said mold and die.

A ring 20b1 Fig. 22 of resilient material such as rubber is preferably mounted on the die adjacent the ware brim to define and finally compact said brim. Its resiliency facilitates slight vertical variation in mold elevation, for determining batt thickness, without substantially altering the degree of brim compacting. Under excessive pressure it yields and permits the excess clay to escape in thin sheet form and on decompression it progressively parts from the clay batt brim. A resilient porous material such as felt may be employed and air under pressure applied thereto during parting of batt from the die to absolutely ensure release.

The final elevation of the mold and final depression of the plunger may or may not be simultaneous as found most advantageous. The complete elevation of the mold is only momentarily to provide a pause during which the applied clay charge stabilizes itself and comes to rest. After this short pause, it is preferred to drop the mold slightly by providing the cam 10b, as shown in Fig. 4, with an offset 10b1, and, substantially simultaneously, to admit compressed air to the cavities 20d and 20h and consequently through the porous die 20b and head 20g to the juncture of the formed clay batt and the porous dies, which serves to rupture the bond, repel the clay batt from the die, and ensure adhesion of the batt to the mold. The chuck is kept elevated to hold the mold in this position the maximum period of time permissible in a cycle, thereby providing a prolonged interval during which the batt and mold may be repelled from the die without serious consequences. Should there be slight tendency to adhere and the chuck were immediately lowered, then the mold would drop a considerable distance and might be broken by the impact. However, this short drop being only about 1/32 of an inch, provides for delayed release without serious consequences and consequent interruption of operations. To still further provide against possibility of adhesion of the batt and mold to the porous die, and also insure adhesion of the batt to the mold, vacuum is applied to the duct 17j (Fig. 16) in the chuck just prior to final elevation of the mold, then prior to the mold contacting with the ring 5p, the vacuum is shut off and super atmospheric pressure may be admitted to release the mold from the chuck. To provide against the formation of ring marks on the ware the charge is spread preferably rather quickly which prevents halting of the spreading action which might otherwise take place due to setting or hardening of the clay before the charge has completely covered the mold. To further insure against interruption or derangement in operation, the degree of hardness at certain points may be increased on the molds where they are subjected to ware or severe pressure from batt application. This may be provided for by coating the surface of the mold with a suitable hardening solution such as shellac or providing the mold with a permanent metallic reinforcement as shown in my copending application Serial No. 343,693 by Figs. 8 and 8A.

*Forming and profiling station*

After the batt is formed and the mold deposited on the tray, it is advanced to the next station B and another chuck 11 elevates it to final forming operating position through the toggle and cam mechanism shown in Fig. 8. The action here is different from that imparted at the pressing position. It is preferred to elevate the mold rather rapidly until the batt contacts with the profile tool, or within from .030 inch to .050 inch of maximum elevation, then slowly to maximum elevation, to avoid ripping of the clay surface by the profile tool. This is followed by a dwell period followed by a very slow drop of about .005 inch to provide for progresssively reducing the pressure of the profile tool on the ware surface during the terminating polishing operation and also avoid the usual tool mark on the ware surface when ware and tool are parted abruptly, then rather rapidly until the mold nears the mold ring 5p, then slowly while depositing the mold on the ring, then the chuck is dropped rapidly. This method of procedure produces ware free from tool marks and is particularly applicable when the batt is mechanically applied and of dependable unvarying thickness and contour.

Referring to Fig. 2, a girder 22 supported by bracket 22a is secured to the frame part 4a2 and provided with a suitable bearing to support a rocker shaft 13a to which are secured arms 22c connected together by a cross bar 22d. To girder 22 are secured the profiling implements (see Figs. 29, 30, 31, 32) by means of dowels and bolts 22e, the girder 22 being provided with a series of holes similar to that shown in Fig. 12. To reduce the time necessary in the replacement of these profiling implements and provide for adjustment while in operation, thus providing for the maximum of continuous operation, I have assembled into one unit and arranged to be assembled and adjusted on a dummy set up apparatus, mechanisms ordinarily individually attached to the machine. Thus, I have assembled into one unit the profile tool, the trimmer and operating mechanism, the water and air application nozzles and a spill plate or splash guard so that when changing from one type of ware to another, the time necessary is materially reduced, and when applied, immediate production obtained without tedious interruptions due to adjustments.

The preferred form of profile for flat ware is as shown in Figs. 29, 30, 34, in which a frame 22f is integral with or fixed on a head 22g. The frame 22f was heretofore made of wood, but I prefer to make it of a light metal which does not stain clay such as aluminum. In Fig. 34, is shown the preferred method of securing a profile blade 22h onto the frame 22f, providing for quick replacement of blades when they become dull from use. The frame 22f is provided with two rectangular bosses 22i, and the blade 22h with two projecting ears 22j; a clamp 22k secured by screws 22m retains the blade 22h in position against upward displacement, the ears 22j resting on the bosses 22i limiting the lowermost position of the blade, and the blade edges fitting snugly between the bosses 22i determine lateral positioning. As the cutting edge of the blade 22h wears away and is redressed, the ears, where they contact with the bosses 22i, are dressed back to an equal extent and checked for accuracy in the dummy set up, so that when replacing the blade, it is necessary only to drop it onto the bosses 22i and tightening screws 22m, in order to insure correct position without tedious trials and adjustments. In case it is desired to adjust the lower portion only of the profile frame and also provide for quick replacement in correct position, the structure shown in Fig. 30 is preferred. The head 22g is provided with two dowel holes 22n into which project two studs 22o threaded into a plate 22p. The profile frame 22f is provided with two enlarged openings 22q and the stud 22o is provided at both ends with nuts and washers. By removing nut and washer 22r, the profile frame may be removed from the head 22g and replaced in correct position. By loosening nut and washer 22s, the frame 22f may be adjusted. As the quality of the ware is dependent upon the sharpness of the profile cutting edge and the abrasive nature of the clay necessitates frequent replacement, the advantage of this quick change arrangement is apparent.

It is desirable to establish and maintain an optimum speed of mold rotation for each kind or line of ware, while selectively limiting or terminating the profiling operation or predetermining the number of rotations during which the ware in each line is in contact with the profile in order to avoid excessive or deficient tooling of the surface, by withdrawing the tool from the ware surface, when said surface is in the best condition, irrespective of the operative conditions of the other molds and ware thereon.

To achieve these results the profile holder is mounted on a pivot (see Fig. 25) which is positioned so that when tilted, the blade will progressively recede from the ware surface at all points. A screw adjustably limits the approach of the blade to the mold surface and a spring adjustably mounted determines the application pressure. The holder is provided with an arm having in its end an adjustment screw which contacts with a cam mounted on a shaft as shown in Fig. 36.

According to usual present practice, it is necessary to manually remove the excess clay from the face of the profile after each piece of ware is made. Obviously, in an automatic machine, this is impractical and I have therefore devised a means for automatically disposing of this excess clay. In Fig. 35, I show the conventional profile, whereas in Figs. 30 and 34 my improved type of profile. A groove 22t is provided in the lower edge of the frame adjacent the blade and a ledge 22u extends to nearly the same depth as the cutting edge of the blade 22h. The groove 22t is of smaller cross section at the center forming portion 22v and of gradual enlarged cross section as it approaches the rim forming portion 22w which extends over the edge of the mold. As the blade 22h scrapes off the excess clay from the batt, the taper portion 22y of the blade 22h forces the clay into the top of the grooves 22t and the ledge 22ℓ confines it so that gradually a pressure is built up in the groove 22t which pressure, due to the enlarged size of the groove at 22w and the open end 22w, is less at 22w than at 22v, and the clay will move to the point of least resistance and emerge from the opening 22z in the form of a column clearing the edge of the mold and being projected some distance away from the edge of the mold and profile frame. This action is assisted by the lubricating action of the water mixing with the clay which is scraped off by the profile, the application of this water being explained later.

When making large ware, it may be desirable to assist the extruding forces above outlined by providing a curved profile, (Fig. 33) at aa so that the rotating face of the batt contacts tangentially with the blade and the clay in the groove 22t and thereby assists in pushing the clay towards the periphery of the mold, as shown. Substantially the same effect may also be realized by providing one profile 22h placed radially for the central portion of the ware, as shown in Fig. 33 and one profile 22hh placed tangentially for the outer portion of the ware.

When making cups etc. in cavity molds, the profile tool may also be inclined from the true vertical or twisted like an auger to produce the same results. In addition or as a substitute, ratchet teeth 22wt inclined towards the outlet 22w may be provided in the heel of an inclined surface of the cutting edge 22h which serve to direct and propel the clay initially towards the outlet 22w.

The speed of rotation of different sized ware must be kept within certain limits and in Fig. 37 I show means for adjusting the speed of the chuck. Fig. 37 is a detail of the pulleys shown in Fig. 4 and designated at 16t and 16q. A belt 16s of the V-type transmitting power between the two. The sheaves are in two halves 23 and 23a, held in adjusted position by screws 23b and secured to the shaft by screw 23c. By separating one sheave as shown at 23d and closing the other as shown by 23e, the same length of belt will serve, while the speed is altered. Any other means may be employed for obtaining this speed variation.

During the profiling operation, it is necessary to apply a lubricant such as water to the surface of the ware to prevent undue drag of the profile blade on the clay and assist in polishing the surface of the ware at the termination of the profiling operation. The application of this water has a considerable bearing on the quality of the ware produced. The quantity of water applied, the time of application, the duration of application, the location and angle of impact and the number of applications are the more important.

A bracket 23f (Figs. 29, 31, 32) extends from the profile frame 22f and is provided with a universal connection 23g detailed in Fig. 38. A bar 23h extends from this universal connection and is provided at its outer end 23i with another universal connection to which is secured the nozzle 23j thus providing for vertical, horizontal and angular positioning of the nozzle member 23j. A plurality of nozzles and securing means may be provided so that succeeding jets of water may be applied to the surface of the batt at various points and times.

The valves for controlling the application of water to the nozzles are shown in detail in Figs. 10 and 11 and the method of operating these valves in Figs. 18 and 19. The cams and valves are further illustrated in Fig. 3 at 15 and 15c, their operation being in synchronism with the rotation of cam shaft 9d. Fig. 39 illustrates, diagrammatically, the plan of employing a multiple of valves all connected to one nozzle and the valves timed so that they function in sequence. Lateral pipes 23k connect with nozzle manifold 23m at one end and with the valve manifold at the other. Each is provided with an adjustable control valve 23n and a check valve 23o and each profile is provided with a similar structure, a nozzle 23j is connected to the end 23p of the nozzle manifold. By closing one or more of the valves 23n, that portion of the stream controlled by that particular valve is eliminated, so that either an interrupted stream or a stream of less duration depending on which valves are closed, is applied. The check valve 23o prevents back flow of water to thus insure accurate functioning of all the nozzle units. At times, it is desirable to apply succeeding jets of water at different points on the surface of the batt and in that case, the valve manifolds and checks 23o are eliminated, the nozzles being connected directly to their respective lateral pipes 23k. Any one or more of the nozzles may be rendered inoperative by closing valve 23n. The nozzles proper may be constructed as shown in Fig. 40, the pipe 23p having on its end an orificed cap 23q adjustable with respect to a fixed needle valve 23r in order to vary the cross sectional area of the stream. By properly proportioning the needle contour with the orifice contour, any desired shape of stream from a solid stream to an open spray may be obtained, the former serving for definite point application, the latter for promiscuous application. Under certain conditions, it may be desirable to retract the nozzle away from the working surface of the ware after it has applied its charge of water and in Fig. 40, I have detailed a structure adaptable to this purpose. A casing 23s is provided with an enlarged bore 23t in which works a piston 23u secured to a hollow piston rod 23v, a spring 23w being located between the piston and smaller part of the casing. The latter has an inlet 23x and a by-pass port 23y. A gland 23z prevents leakage around the piston rod. A lug 24 facilitates securing the nozzle to the profile frame 22f through universal connections previously described. The spring 23w serves to keep the piston normally in a position adjacent the inlet 23x and when water is admitted through valves (Figs. 10 and 11) and inlet 23x, the piston rod and nozzle are forced forward uncovering port 23y and permitting water to pass into the smaller bore chamber 24a and through a port 24b into the hollow piston rod and thence to nozzle 23q. When the water pressure in the inlet 23x is shut off and that port connected to atmosphere, the spring 23w forces the piston backwards and simultaneously acts to suck back any water that may still remain in the hollow rod 23v, so that this valve structure functions to first project the nozzle to the desired position, then apply a jet of water to the ware surface, and then retract the nozzle away from the ware preventing dripping of water onto the same when the nozzle is inactive and prevent damage to the nozzle or ware during its inactive period.

In Figs. 10 and 11, the valve casing 15c is provided with a valve body 24d secured by its stem 15a to a star wheel 15b and provided with three ports 24e and three vents 24f intermittently communicating with ports 24g and 24h and leakage port 24i in the casing so that when the valve is in position shown in Fig. 10, water from the supply line enters at 24g and issues at 24h and thence to the various nozzles. At the next ⅙ rotation of the valve, port 24f communicates with 24h and 24i to thereby connect the nozzle to the atmosphere or vacuum.

After the plate is profiled, to finished shape, it is necessary to trim the clay from the brim and exposed portions of the mold which during the profiling operation has become coated with clay. For this purpose, I have provided the structure shown in Figs. 29, 30, 31 and 32.

The trimmer blade 26 (Fig. 29) is secured to an operating pitman 26a through the medium of the universal clamp (Fig. 38) and is retained in lateral position by a bracket 26b. The pitman 26a is pivoted at its far end to a lever 26c, pivoted at 26c1 and which in turn is connected to a bell crank 26d by the link 26e, the bell crank 26d being provided in its horizontal portion with a stud 26f which contacts with the bar 22d. A lug 26g projects from the pitman 26a and contacts with a screw 26h threaded into a projection of the frame 22f to thereby adjustably limit the advance of the trimmer blade 26 towards the edge of the ware. A housing 26i projects from the frame 22f and is bored to house a spring 26j and a plunger 26k. The spring tension is adjustable through screw 26m and detent 26n and the plunger resiliently contacts with a cam 26o secured to the pitman 26a, its upper surface being contoured to suit. The lever 26c and the vertical portion of the bell crank 26d are provided with screw studs 26q carrying movable pivot blocks 26r to which is pivoted the link 26e and whereby the vertical position of the link may be adjusted and thereby adjust the horizontal travel of the pitman 26a while in operation. The bar 22d extends across all the units of the machine (see Fig. 3). The screw 26f is provided with an adjustable collar 26s, a spring 26t and an adjustable collar 26u. The collar 26s adjusts the tension of the spring 26t and the collar 26u determines the vertical position of the head of the screw 26f. By adjusting the collar 26u upwards, a gap is provided between bar 22d and screw head 26f across which the bar 22d must travel before contacting with the screw and consequently delays the advance of the trimmer 26 and also reduces its extent of travel forward. Then, by adjusting the link 26e downward, the extent of travel may be restored and its speed of travel is increased. By adjusting the link downward as before, and maintaining the collar 26u in its present position, the trimmer is caused to function earlier, the spring 26t compressing on final depression of bar 22d due to the screw 26h limiting the advance of pitman 26a and this also increases the dwell of the trimmer 26 in advanced position. This provides for operating a multiple of trimmers off a reciprocating bar having uniform travel throughout and enabling the operator to obtain variations in speed of trimmer, dwell in advanced position, instant of advance and maximum pressure applied to advance the trimmer. Through the medium of the housing 26i and cam 26o, pressure of the trimmer 26 against the mold surface may be adjusted and the contour of the cam 26o provides for varying the pressure of the trimmer blade on the mold at any point during its travel. To provide against derangement of the trimmer 26 from nicked or defective mold brims and to properly start the trimmer over the edge of the brim of the mold, I provide the cam 26o with a lower or under side contoured surface which may be to a different contour than the upper portion and which bears against a screw 26p and limits the lowermost position of the blade 26. To provide for quick replacement of trimmers 26, a dog 27 having a dowel 27a secured in one end is clamped to a stem 27b by a screw 27c, thus providing for the removing of the stem 27b and trimmer 26 as a unit and replacing it with another unit which has previously been set correctly on a dummy or duplicate unit away from the machine, or replacing the same unit in exact position it occupied before removal, thereby greatly reducing the time otherwise necessary replacing a trimmer and adjusting it carefully. The universal mounting of the trimmer 26 facilitates the setting of the blade 26 to any desired angle both vertically and horizontally and also its position horizontally on the mold and also its degree of tangential travel on the mold. To insure against adhesion of the clay on the trimmer 26, I prefer to advance the trimmer rather rapidly to thereby increase the size and weight of the trimmings which renders them less liable to adhere to the blade due to momentum they possess. To still further insure against adhesion and to direct the trimmings to a predetermined point of deposit, I provide a nozzle member 27d, controlled by valves such as shown in Figs. 10 and 11, adjacent the profile and adjustably secured in position by the universal clamp heretofore described. During the trimming operation, this nozzle 27d directs a jet of air against the trimmings to propel them to a definite point of deposit and prevent adhesion to the blade 26. An air nozzle 27e, similarly controlled and mounted, is directed against the ware to remove or uniformly distribute excess water or slurry over the surface of the ware.

When making cups, etc., the structure as shown in Figs. 31 and 32 is employed. In this case, the profile is also provided with a waste material extruding groove and is mounted substantially similarly to that shown in Figs. 29 and 30. The trimming operation however is somewhat different. The top surface of the mold is preferably convex shape and a wire 28 is secured by a universal joint to an operating lever 28a. A screw 26f mounted and functioning similar to that shown in Fig. 29 transmits motion from the bar 22d to the lever 28a, which is pivotally secured at 28a1 to the profile frame 22f through an extension 23f. A screw 28b provided with collar 28ba, limits the lowermost travel of lever 28a. The wire trimmer 28 is flexible and is mounted so that at first contact with the mold, it is in the position shown at 28c and when depressed to maximum position it is as at 28, intermediate of these two positions, it follows the contour of the mold top having point contact only so that on initial contact, it cleans the outer edge of the mold and progressively follows to the bore, then when being elevated this is repeated in reverse. In this type of trimmer, it is of greater importance to depress the trimmer rapidly to thereby remove large portions of excess clay at one time so as to prevent adhesion of the clay to the wire 28 and also prevent throwing of fine chips or shavings of clay into the mold interior. The screw structure 26f heretofore more fully explained serves to control the speed of trimmer application on cups independent of that employed in making plates. An air jet 28d, mounted on a universal joint, aids and insures dislodgment of trimmings and directs their deposition. The trimmer is elevated by means of springs 28e. The profile frame 22f is provided with brackets 23f and 28f to which is secured waste material spill pan or guard 28g, provided with a bore 28h and an upwardly extending cone 28i whose upper bore is slightly larger than the mold and this cone is for the purpose of preventing waste material from falling down into the mechanism beneath the mold and enabling the accumulation of a large quantity of waste material in the pan to thus provide for less frequent removal. The pan is provided with a floor 28j and an outer wall 28k, the outer wall acting as a splash guard to prevent the throwing of waste material onto adjacent molds and confines it within a definite area.

Fig. 38 shows a universal adjustment clamp. A securing stem 25 is a snug fit in the bore of the split clamp 25a which is bored at right angles for insertion of a stud 25b having a head 25c at one end and a threaded portion 25d at the other in engagement with nut 25e, a washer 25f loosely encircles the stud 25b which has a bore through which a tube 25h or rod may be projected. When the nut 25e is loosened, it simultaneously loosens rod 25h and 25 so that the rod or tube 25h may be swung around in any position besides being slidden along the bar 25 to change the location. This type of clamp provides for quick adjustment of the spray nozzles and various tools herein described.

Drier

The drier E is arranged behind the fabricating machine and the mold conveyor of the latter may be continued through the drier as described in my copending application Serial No. 343,693 or a transfer device as described in my Patent No. 1,809,861, may be employed to transfer the ware and molds from the trays of the fabricating machine to the trays of the drier. The conveyor in the drier is guided by sprockets in an undulatory course returning to the machine sprockets 4k as shown in Fig. 1.

The conditions in the drier are controlled by three large conduits, one being a conduit supplying hot dry air, preferably waste air from the tunnel kiln of the pottery, another a conduit in which a partial vacuum is maintained by a fan, and the other a conduit containing spent air under pressure of the fan. By connecting the various drier zones with these three conduits through a system of pipe connections, valves and lateral adjustable nozzle, the temperature and moisture conditions in the drier zones can be controlled as desired. This is required in order to preserve the plaster molds, which are ruined by exposure to dry temperatures above 135° F. but can stand up to 200° F. if the humidity is high. The tunnel kiln air is generally too high in temperature and low in humidity to be safely used at the ware entrance end of the drier and must be diluted with moist spent air.

However to completely dry the molds before reuse, air at 135° F. and lowest possible humidity is admitted at the mold exit end E1 of the longitudinal chamber N and travels towards the ware discharge end E2 of the drier, then through the undulating channel E6 towards the oncoming molds, and ware inlet end E of the drier, gradually becoming more saturated with moisture and loses heat, until its drying efficiency is impaired, then some of the spent air is withdrawn and replaced by kiln air to re-establish the most efficient air condition.

At certain points in the drying tunnel, gages and lateral nozzles E4 connecting to all three conduits are installed. Valves provide for selectively connecting each nozzle to any of the three conduits. When the gages show excessive humidity or deficient temperature, then through one nozzle vacuum may be applied to withdraw some of the cold or moist air and through the next nozzle hot or dry air from the kiln air conduit may be admitted, thus maintaining optimum condition of the air at any point in the drier.

This reconditioning will be frequent at the ware entrance end of the drier and progressively less frequent as the ware progresses and moisture extraction is slower. This three pipe system provides for all practical requirements in actual operation, provided sufficient waste heat from tunnel kilns is available. Otherwise, steam or electric heating means E5 must be provided. All excess spent air not needed may be discharged through the stack at the ware entrance end E of the tunnel.

Additional fabricating stations may be provided following the drier, or at an intermediate stage of the drying operation.

Fig. 6 illustrates a subsidiary fabricating unit F adaptable to be installed on the top of the drier E at any point along its length. It is shown as equipped for "laying to" ware on molds, but may obviously be employed otherwise, such as for the removal of semi-dry cups, etc. "Laying to" is that step in the production of ware from certain kinds of clay wherein the ware after jiggering is dried to leather hardness, then again pressed firmly to the mold to correct warpage.

The unit consists of a frame 40a, tool supporting girder 40b, guide pulleys 40c and 40d, a rocking lever 40e, lever pulleys 40f and 40ff pivoted to the ends of the rocking lever 40e which is pivotally mounted in the frame 40a intermediate its ends and on a fulcrum 40ee substantially in alignment with the trunnion of the stationary tray 41a. The chain carrying trays heretofore described engages the pulleys, extending up from the dryer and returning thereto. The chain within the dryer travels continuously and it is necessary to halt a tray temporarily to perform an operation on a mold mounted thereon also raise the mold off the tray to definitely center and rotate it then again deposit the mold on the tray. To effect this, I mount cams 40 on the shaft 40d1 of pulley 40d, one of which cams engages a roller on a lever 41b pivoted at 41c and connected to a cross head 41d at its other end. Another lever 41e is pivoted to the frame at 41f and has a roller at one end which engages another cam 40o on the shaft 40d1, which lever 41e is connected to a lock bar 41g which is bifurcated at its upper end 41gg to temporarily engage and hold stationary the trunnion of the tray 41a. A cam 41h is mounted on a shaft 41i journalled in the frame 40a and engages a roller on a lever 41j which is pivoted at 41k to the frame and is jointed at 41m to a pitman 41n whose upper end is pivoted to the rocking lever 40e. The cross head 41d is guided to slide vertically in the frame 40a. The rotating unit 42 is secured to the cross head 41d and is driven by a motor 42a which rotates a chuck 42b. The cams may have one or more raised portions thereon to properly synchronize their operation with that of the trays 41a. The dryer is provided with a series of idlers 43 over which the chain and trays travel in an undulating path through the dryer. It is enclosed with a covering mounted on a strong skeleton frame. To attach this fabricating unit, a section of the top covering is removed, the chain on the idler 43 uncoupled and the ends thereof connected to the ends of the extra chain on the idlers of the unit. Power is now applied to the chains in the dryer causing chain run 43b to travel upward and run 43a to travel downward. The guide pulleys 40d and 40c together with their associated cams are rotated causing the lock fork 41gg to be elevated and hold the tray 41a stationary at that instant, the lever pulley 40ff is in depressed position and as slack is supplied to chain run 43b and absorbed in the chain run 43a, the lever 40e will tilt and temporarily compensate therefor, then, cross head 41d is elevated to lift molds off their seats in the trays 41a and rotated against the tool 44, then dropped again onto the trays. Then, the lock 41gg drops, releasing the tray, and the pitman 41n again elevates the rocker lever and pulley 40f after which this procedure is again repeated. Thus, I temporarily halt a tray while maintaining the chain taut at all times, and provide a subsidiary fabricating unit of simple construction which can be installed quickly at any desired location and for any desired purpose.

*Modifications*

Figure 42:
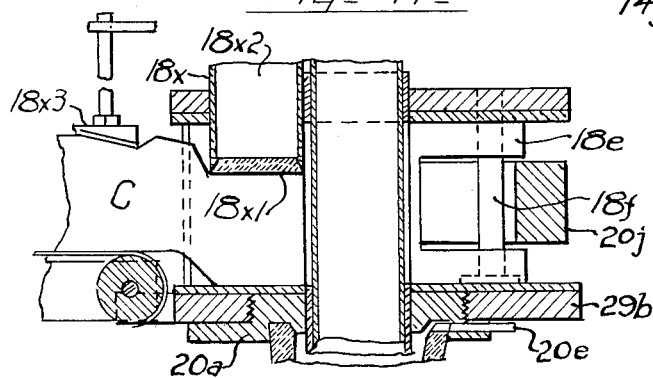

A modified slug severing and clay charge feeding mechanism is shown in Figs. 41 and 42. Jaws 18e defining an aperture 18g, are pivoted on pivots 18f and operated by a yoke 20j through links 20m. Extensions 18w are provided on the entrance end of the jaws 18e which serve to compress and preform the nose of the slug to a definite width after which a plunger 18x descends and compresses the preformed slug within the jaws 18w to a predetermined height, said plunger being hollow and provided with a porous facing 18x1. The plunger cavity 18x2 is connected with a source of superatmospheric pressure. The jaws 18w are also faced with a porous material and have connections 18z connected to a supply of air at superatmospheric pressure thus providing for repelling the formed charge from the jaws and preventing adhesion. As an auxiliary to plunger 18x, a presser foot 18x3 with an inclined porous operative face is provided which serves to partially reduce and, to a degree, push back or retract the excess material from the preforming jaws. The jaws 18e are provided with a cutting edge 19 which serves to segregate the charge from the slug. The belt 18c is intermittently progressed forward to advance the slug to the jaws. This degree of advance once set must be maintained constant and the extent of this advance is adjustable, preferably while in operation and to a known extent (see Fig. 27).

Figure 44:
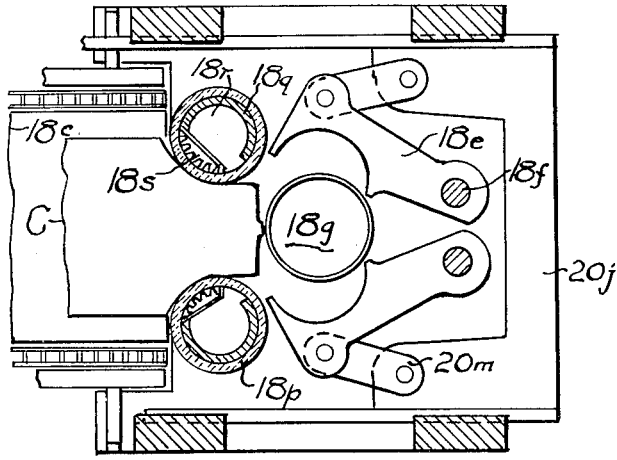

Another modified form of device for feeding the clay slug to the severing jaws is shown in Fig. 44.

In this figure the guides for the slug are shown in the form of rollers 18p whose outer surface is of porous material, each mounted on a pivot or spindle 18q which is stationary and contains two chambers 18r, 18s, separated by a partition. The chamber 18r is connected in any suitable manner to a source of compressed air and the chamber 18s on the clay compacting side of the roller, to a source of vacuum. These spindles 18q are adjustably secured to the frame 18d and the rollers 18p are rotated by means of a bevelled gear drive somewhat similar to that shown in Fig. 45. When a slug of clay comes in contact with the rollers, it adheres thereto due to the suction set up through the porous wall of the roller and chamber 18s and is repelled by the superatmospheric pressure through the walls of the roller after it passes dead center between the rollers. The height of the charge is limited by a roller, not shown, similar to that shown as 18v, Fig. 45. This arrangement provides for drawing a non-uniform over-sized slug of clay forward and reducing it to a uniform size in cross section. Also, the degree or extent of progression of the slug that has passed between the rollers may be predetermined.

Figure 45:
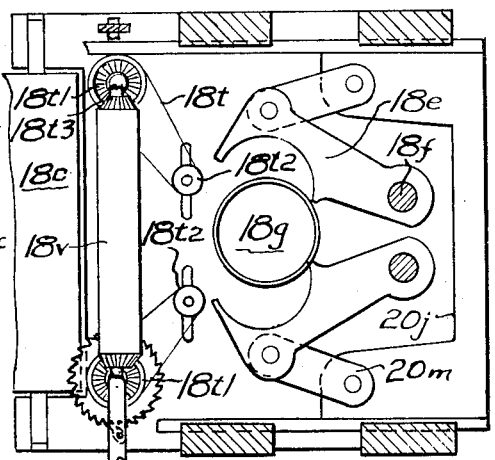

Fig. 45 shows another modification of this wherein belts 18t, preferably made of porous material, or fabric, operate over rollers 18t1 and 18t2 whose periphery may or may not be of porous material or equipped for sub- or super-atmospheric pressure application are provided for advancing a non-uniform over-sized slug, reducing it to a uniform size and advancing it a predetermined distance. The rollers 18t1 are driven in unison by bevel wheels 18t3 from the rod 14g, and the rollers 18t2 are adjustably mounted to vary the gap between them.

A modified form of drive for the slug feed belt is shown in Fig. 46.

Figure 43:
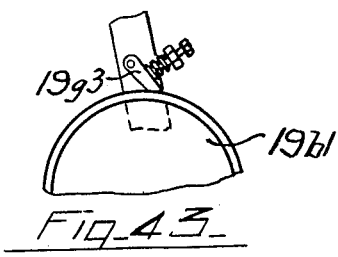

In this figure a ratchet wheel 19b1, lever 14g, and pawl 19g2 are shown as a means of progressing the belt 18c, and the degree of advance is shown as adjustable while in operation by means of a movable pivot 19h of the lever 14g. The adjustment of the pivot is effected by a screw and crank mechanism 19i as described in my previous application Serial No. 275,395. A series of pawls 19g2 may be applied in such a way as to fall into the ratchet teeth progressively to thereby provide for closer adjustment of progression or a friction type of pawl 19g3 as shown in Fig. 43 may be applied. The spring retained pawl 19g3 is of such length as to position its engaging end near dead center so that when moved in one direction it grips the smooth surface of the drive wheel and trails idly in the opposite direction.

In Fig. 36 is shown a structure adaptable to replace the bar 22d of Fig. 4 in the operation of the profiles or trimmers. When ware of such a diversified character is being made simultaneously on different heads of the same machine, that sufficient difference in cycle through the mechanism heretofore described and operating from bar 22d, cannot be obtained then a cam shaft and cam structure somewhat similar to Fig. 36 may be employed A shaft 28m is rotatably mounted in an extension of girder 22 and is connected by a chain and sprockets to the shaft 9d to operate in synchronism therewith. The shaft is splined at 28n and provided with a series of spaced circumferential grooves at 28o. A U-shaped cam 28p is provided with an extension 28q and an adjustment screw 28r at one end and a detent spring 28s at the other. The detent spring 28s serves to retain the cam on the shaft and for quick application and removal. The peripheral grooves 28o are spaced similar to those on the tray (Fig. 12), and they locate the cams horizontally. The screw 28r determines the angular position of the cam and provides for adjustment of said position. Various designs of cams may be quickly applied and removed without interrupting the continuous operation of the machine, or a series of cams may be mounted adjacent each other and slid horizontally along the shaft to position the desided cam in functioning position.

To further provide for quick interchangeability of the equipment for various types of ware and also reduce equipment expense and complication, I provide for standardization of molds at certain points. For making cups or other ware made in cavity molds, I establish and maintain a standard thickness from the outside bottom 17h, Fig. 22, of the mold to the bottom 20g of the plunger 20f regardless of differences in diameter or interior contour of ware or mold 17aa. A manually operated, single head, dummy machine is provided to test out and establish desirable batt thickness, etc. A few molds are made and tested out on the dummy machine to determine the batt thickness producing the best ware, then, the set of molds approximately 1500 are made correctly and only minor adjustments may be required to compensate for slight errors in measurement. In Figs. 16 and 17, I show a device wherewith these adjustments can be quickly made and the extent thereof recorded for future absolute accurate setting when re-applying this particular set of molds. Thus for all cavity mold ware, regardless of height variation, one length of plunger is interchangeably adaptable to all units, likewise, one setting of the chucks 10 and 11 is interchangeable. However, for ware requiring considerably greater or less clay bulk, definite standard diameter plungers, die orifices and jaws are provided in slightly overlapping, progressive steps of bulk capacity. The diameter of the chuck sockets of the molds are also progressively stepped, the steps being as large as the situation will permit. In plate making this same rule holds but a much shorter plunger is required. Cups and plates require different length plungers which are therefore not interchangeable.

The various cams, levers, etc., are preferably provided with means such as are shown in my co-pending application Serial No. 343,693 to provide for adjustment while in operation.

In the appended claims, the terms "different" form", "diverse form" and "diversified" as applied to ware pieces mean not only pieces of different shape or configuration but also the same shape or dimensions but of different surface design, thus a 6" plate, a 6" saucer and an 8" plate are all pieces of different form or two 6" plates of different surface configuration. Likewise, the aforesaid terms as applied to "molds" mean molds of different form, shape, configuration and molding surface or molds of identically the same proportions but varying as to the contour, design or configuration of the molding surface. The term "set" of pottery ware is intended to mean not only a complete set of table ware but any group comprising pieces of diverse form which it may be desired to reproduce.

In the description and claims the term "slug" is applied to a severed length of clay containing sufficient material where a plurality of mold charges and the term "column" is applied to the unsevered cauda adhering to the clay mass from which the slug originated.

I claim as my invention:—

1. The process of making pottery ware which comprises jiggering heated clay on a porous mold.

2. The process of making pottery ware which comprises forming a batt of hot plastic clay, and applying it onto a previously warmed porous mold while mold and clay are at substantially equal temperature.

3. The process of making pottery ware which comprises forming a batt of hot plastic clay, and applying it onto a previously warmed porous mold while mold and clay are at substantially equal temperature, jiggering the batt, and passing the plaster molds with jiggered ware thereon, into a drying atmosphere the temperature of which atmosphere has been previously substantially equalized to that of the entering ware.

4. A machine for making pottery ware comprising a ware forming unit, a porous mold-supporting chuck mounted below said unit, and drive means for raising and lowering the chuck, said means comprising a toggle the knee of which when straightened rigidly supports the chuck during formation of the charge on the mold.

5. Apparatus for jiggering pottery ware comprising a machine for extruding heated clay slugs of predetermined form and dimensions, supports for receiving the slugs, slug advancing means, means for depositing slugs from the extruding means onto the slug advancing means, a charge segregating device to which each slug is advanced by the feeder, a jiggering unit, a movable mold support, and means for applying the segregated charges to the mold while the clay and the mold are at substantially equal temperature.

6. In a machine for making pottery, a cam shaft, a plurality of cams thereon, an actuator rotating with each cam in an angular position predetermined with respect to a quick drop portion of the cam profile, and a buffer offering resistance to the passage of the actuator and means for transmitting motion from each cam to a member functioning in the pottery making operations of the machine.

7. In a machine for making pottery, a cam shaft, a plurality of cams thereon, an actuator rotating with each cam in an angular position predetermined with respect to a quick drop portion of the cam profile, a buffer offering resistance to rotation of the actuator past the buffer, and means for regulating the said resistance and means for transmitting motion from each cam to a member functioning in the pottery making operations of the machine.

8. A machine for making pottery comprising a ware preforming station, a ware jiggering station, a drier with guide pulleys therein defining an undulatory conveyor path, a ware forming station mounted on the outside of the drier and containing guide pulleys defining an undulatory conveyor path through the station, a conveyor arranged to convey porous ware forming molds successively into cooperation with all of said stations and along the undulatory paths through the drier and the ware forming station, and means in said forming station for temporarily halting molds thereat without arresting the general advance of the other molds by the conveyor.

9. In a machine for making pottery ware, a drier, a flexible conveyor of substantial length traveling continuously in an undulating path through said drier, trays carrying molds trunnioned in the conveyor, ware fabricating implements located adjacent the conveyor and adapted to effect major fabricating operations on said molds and means for successively halting each of said trays for an appreciable period of time while the conveyor adjacent the halted tray remains taut and continues to move continuously.

10. An installation for the manufacture of pottery ware comprising: an endless conveyor arranged to convey ware forming molds in a repeated working cycle, a drier traversed by the conveyor, and a ware fabricating station also traversed by the conveyor and enclosed in a housing movable to different definitely located positions on the drier.

11. An installation for the manufacture of pottery ware comprising: an endless conveyor arranged to convey ware forming molds in a repeated working cycle, a drier traversed by the conveyor, a ware fabricating station also traversed by the conveyor and enclosed in a housing movably mounted on the drier, a stop member movable in the auxiliary station to halt temporarily at the station a member of the conveyor, a rocker arm fulcrumed in alignment with the stop and engaging an adjacent portion of the conveyor, and means for moving the stop member into member halting position and simultaneously swinging the rocker arm to change the linear motion of said conveyor portion into a rotational movement about the halted member as center.

12. An installation for the manufacture of pottery ware comprising: an endless conveyor for conveying ware forming molds cyclically through fabricating steps said conveyor having a loop portion extending into a fabricating station, means for producing general advance of the conveyor, a stop member movable in the fabricating station to engage and temporarily halt thereat a mold supporting member in the loop portion of the conveyor, a rocker arm fulcrumed in alignment with the stop member and engaging the adjacent portion of the conveyor, and means for moving the stop member into engagement with said conveyor member and simultaneously swinging the rocker arm to change the linear motion of the engaged part of the loop into a rotational movement about the halted member as center.

13. A method of temporarily halting a point or member of a traveling chain, belt, conveyor, or the like without interrupting its general travel consisting in positively halting the point or member at the desired halting place and during the period of arrest changing the linear motion of a portion of the chain, belt, conveyor, or the like containing said point or member into a rotary motion about the point or member as center.

14. A method according to claim 13, in which linear motion is changed into rotary motion of a portion of the chain or the like in a loop offset therefrom.

15. An installation for the manufacture of pottery ware comprising: an endless conveyor arranged to convey ware forming molds, a ware fabricating station traversed by the conveyor, a stop member movable in the fabricating station to halt temporarily at the station a member of the conveyor, a rocker arm fulcrumed in alignment with the stop and engaging an adjacent portion of the conveyor, and means for moving the stop member into member halting position and simultaneously swinging the rocker arm to change the linear motion of said conveyor portion into a rotational movement about the halted member as center.

16. A pottery mold chuck comprising: a drive spindle, a chuck body adjustable to predetermined angular positions relatively to the spindle, means for locking the chuck body and spindle against relative rotation in any angular adjustment, and means on the chuck body for supporting a mold in a definitely located position with respect to said body.

17. A pottery mold chuck comprising: a drive spindle, a chuck body having limited axial play on said spindle, and resilient means opposing said play.

18. A pottery mold chuck comprising: a drive spindle, a chuck body having screw thread connection with and limited axial play on the drive spindle, and resilient means opposing said play.

19. A pottery mold chuck comprising: a drive spindle, a chuck body having screw thread connection with the drive spindle, means for locking the chuck body and spindle against relative rotation and in any mutual angular adjustment, means on the chuck body for supporting a mold in a definitely located position with respect to said body, and a visible scale on the chuck permitting precision of location of the body on the spindle.

20. A pottery mold chuck comprising: a drive spindle, a chuck body adjustably connected to said spindle, and a bushing adjustably mounted in the mold receiving portion of the chuck body and having a scale for indicating its position in said body, and means for locking the bushing in adjusted position.

21. Pottery jiggering machine comprising: a main frame, a mold carrier movably supported in said frame, mold positioning seats arranged in said carrier in groups transverse to the direction of carrier movement, a series of ware fabricating units arranged to cooperate with the mold on said seats in series, auxiliary frames removably supported on the main frame and carrying said fabricating units, and locating means spaced transversely on the machine frame, auxiliary frames, mold carriers and mold seats, the number and spacing of said devices and the dimensions of the auxiliary frames being determined to provide for a variable number of side by side lines of ware production in the machine.

22. A machine according to claim 21, in which the fabricating units comprise a slug feed belt in each production line mounted in an auxiliary frame having selective locating means at its front and rear ends.

23. A machine according to claim 21, in which the fabricating units include a slug feed belt and a charge severing device in each production line, and in which the slug feed belt is mounted in an auxiliary frame having selective locating means at its front and rear ends, the latter locating means cooperating with corresponding locating means on the charge severing device.

24. A machine according to claim 21, in which the fabricating units comprise jiggering devices mounted on a jiggering frame, a cross girder in the machine frame on which girder the jiggering frame is removably and adjustably mounted, an oscillatory lever comprising means for the adjustment of the amplitude and end points of its oscillation, said lever being pivotally mounted on the jiggering frame, a trimming tool carried by said oscillatory lever, and production line locating means on the jiggering frame and cross girder.

25. A jiggering machine for making pottery ware, comprising a porous mold, a mold support, a conveyor adapted to support an elongated slug of clay, means for advancing said slug stepwise toward the mold, means for segregating clay charges from said slugs for deposit on said mold, means for applying said charge to said mold, means for profiling said charge, a dryer, and means for conveying said mold thereto.

26. A machine for making jiggered pottery ware, comprising a plurality of porous molds, a support therefor, means adapted to support a plurality of elongated slugs of clay, means for simultaneously advancing said slugs toward the molds, means for segregating clay bodies from said slugs for deposit on said molds, means for adjusting the bulk of said bodies, means for spreading and applying said bodies to said molds, means for jiggering the clay after spreading, and a drier through which said molds are conveyed subsequent to jiggering.

27. An installation for the manufacture of jiggered pottery ware which comprises, in combination, means for forming clay slugs, means for segregating charges from said slugs, means on which said slugs are travelled thereto, a conveyor having a plurality of molds disposed thereon, means for operating said charge-segregating means and said conveyor in timed relation whereby molds are presented to and receive charges from the segregating means at a charging zone incident to the segregation of charges, means for applying said charges to said molds, means for releasing the charges from the applying means, means for jiggering said charges, and a drier traversed by said conveyor and through which said molds are conveyed subsequent to jiggering.

28. Apparatus for the manufacture of jiggered pottery ware which comprises, in combination, a conveyor having a plurality of mold supports associated therewith, molds on said supports, means for automatically segregating clay charges located adjacent said conveyor, means for supplying said segregating means with clay in slug form containing a multiple of mold charges, means for applying clay charges to molds, means for jiggering said charges on said molds, and a drier associated with said conveyor and in which the latter travels at least in part.

29. Apparatus for the manufacture of pottery ware which comprises, in combination, a conveyor having a plurality of mold supports, diversiform molds on said supports, means adjacent said conveyor for automatically segregating clay charges, means for conveying a plurality of clay slugs each containing a multiple of mold charges to said segregating means, means for spreading clay charges over the surface of the molds and bonding the same thereto, jiggering means for cooperation with said molds, and a drier in which said conveyor travels at least in part.

30. Apparatus for the manufacture of pottery ware which comprises, in combination, a conveyor having a plurality of mold supports, a plurality of molds carried by each support, means adjacent said conveyor for segregating clay charges, means for supplying said segregating means with clay slugs in timed relation with the production of said charges, means for varying the bulk of said charges, means for applying said charges to said molds, means for jiggering said charges on said molds, and a drier associated with said conveyor.

31. Apparatus for the manufacture of pottery ware which comprises, in combination, a plurality of mold supports, a plurality of molds carried by each support, means for moving said supports, means for forming clay slugs containing a multiple of mold charges, means for automatically segregating a plurality of clay charges simultaneously therefrom which are travelled to said molds, means for conveying said slugs to said segregating means, means for simultaneously applying clay charges to a plurality of said molds, and means for jiggering a plurality of charges simultaneously on a plurality of molds.

32. Apparatus for the manufacture of pottery ware which comprises, in combination, a conveyor having a plurality of transverse mold supports, a plurality of molds associated with each support and establishing in the direction of the length of the conveyor a plurality of production lines, apparatus for segregating clay charges associated with each production line, a conveyor belt associated with each charge-segregating apparatus and on which clay slugs containing a multiple of mold charges are deposited, means for operating all of said segregating means simultaneously to form clay charges which are deposited on said molds, a plurality of means for applying clay charges to molds, means for cooperating all of said applying means with said molds simultaneously, a plurality of jiggering instrumentalities, means for elevating and rotating a plurality of molds simultaneously in cooperation with said jiggering instrumentalities, and a drier through which said mold supports are travelled.

33. Apparatus for the manufacture of pottery ware which comprises, in combination, a conveyor having a plurality of mold supports associated therewith, molds carried by said supports and forming in the direction of length of the conveyor a plurality of lines of molds, charge-segregating means associated with each line of molds, a plurality of conveyors associated with each charge-segregating means adapted to receive and transport thereto clay slugs containing a multiple of mold charges, means for forming clay slugs, means for applying clay charges to a multiple of molds simultaneously, means for jiggering clay charges on a multiple of molds simultaneously, and a drier in which said conveyor travels at least in part.

34. Apparatus for the manufacture of pottery ware which comprises, in combination, a conveyor having a plurality of mold supports associated therewith, molds for forming flatware and hollowware located on said supports and forming in the direction of the length in the conveyor a plurality of production lines, means adjacent said conveyor for segregating a multiple of clay charges, means for supporting and conveying detached clay slugs each containing a multiple of mold charges to said segregating means, means for applying clay charges to molds, means for jiggering clay charges on said molds, and means for elevating and rotating said molds in cooperation with said jiggering means.

35. Apparatus for the manufacture of pottery ware which comprises, in combination, a conveyor, molds carried by said conveyor, means for segregating clay charges located adjacent said conveyor, conveying means for clay slugs containing a multiple of mold charges associated with said segregating means, means for advancing said slug conveying means in timed relation with the operation of said charge segregating means, means for advancing said conveyor for molds in timed relation with the operation of said charge-segregating means, means for applying clay to said molds, instrumentalities for jiggering clay on said molds, and means for rotating said molds in cooperation with said jiggering instrumentalities.

36. Apparatus for the manufacture of pottery ware which comprises, in combination, a mold conveyor carrying a plurality of molds, a charge-segregating apparatus, means for moving said conveyor whereby a plurality of molds are advanced and then halted adjacent said charge-segregating means, a plurality of conveyors associated with said charge-segregating means adapted to deliver a plurality of clay slugs thereto containing a multiple of mold charges, means for applying clay charges to said halted molds, means for releasing said applying means from said clay, means for jiggering the clay on said molds, and means for drying the clay.

37. Apparatus for the manufacture of pottery ware which comprises, in combination, a conveyor and a drier in which said conveyor travels at least in part, a plurality of conveyors located adjacent said mold conveyor for transporting clay slugs each containing a multiple of mold charges, means for segregating clay charges from said slugs which are deposited on said molds, dies for applying said charges to said molds, means for elevating said molds incident to the application of clay charges thereto, means for releasing the clay from said dies, instrumentalities for jiggering clay on said molds, and means for elevating and rotating said molds in cooperation with said jiggering means.

38. Apparatus for the manufacture of pottery ware which comprises, in combination, a mold conveyor having a plurality of molds thereon, a charge-segregating apparatus located adjacent said conveyor, means for feeding said charge-segregating apparatus with clay in slugs welded together and advanced as a column, means for applying clay charges to said molds comprising a die having an open center and a plunger working therein, means for moving molds into cooperation with said die and plunger, means for releasing said die and plunger from the clay, instrumentalities for jiggering, trimming and lubricating the clay, means for elevating and rotating said molds in cooperation with said jiggering and trimming instrumentalities, and means operable incident to the jiggering of clay for actuating said lubricating instrumentalities.

39. An installation for the manufacture of pottery ware which comprises, in combination, a drier, a conveyor associated therewith and supporting a plurality of molds, means for fabricating pottery ware located adjacent said conveyor and adapted to fabricate ware automatically on the molds carried thereby, said fabricating means including a feeding station and means for receiving and advancing elongated clay slugs, means for segregating clay charges therefrom, means for determining the bulk of the charges to be severed, means for applying said charges to said molds, and means for jiggering the same thereon.

40. Apparatus for the manufacture of pottery ware which comprises, in combination, a conveyor having a plurality of mold supports associated therewith, molds on said supports, means adjacent said conveyor for segregating clay charges, means for conveying clay slugs containing a multiple of mold charges to said segregating means, means for applying clay charges to said molds, and means for jiggering said charges subsequent to application to said molds.

41. Apparatus for the manufacture of pottery ware which comprises, in combination, a plurality of mold supports, a plurality of molds carried thereby, charge-segregating means for forming a plurality of charges, a plurality of conveying means associated with said segregating means for conveying clay slugs each containing a multiple of mold charges thereto, means for applying charges to a multiple of molds simultaneously, and means for jiggering charges simultaneously on a multiple of molds.

42. In the mechanical automatic manufacture of pottery ware on molds, the method which consists in circulating a plurality of molds through a fabricating and a drying zone respectively, simultaneously forming clay slugs and transporting and segregating the same into clay charges, applying the charges to said molds and jiggering the clay on said molds into ware, and thereafter drying the same.

43. In the automatic mechanical manufacture of pottery ware on molds, the method which consists in circulating a plurality of diversiform molds in an endless path to and through a ware fabricating zone and a drying zone, forming and transporting clay slugs of different cross-sections to a segregating zone, segregating clay charges therefrom, applying said charges to said molds, jiggering the clay thereon, and thereafter drying said clay.

44. In the automatic mechanical manufacture of pottery ware on molds, the method which consists in circulating a plurality of molds in an endless path to and through a fabricating zone and a drying zone, forming and travelling detached clay slugs to a zone of charge segregation, welding the slugs thereat into a homogeneous column, segregating charges from said homogeneous column, applying charges thus segregated to said molds, jiggering the clay, and thereafter drying the same.

45. In the automatic mechanical manufacture of pottery ware on absorbent molds, the method which comprises, circulating a plurality of diversiform molds in an endless path through a fabricating and drying zone and segregating a plurality of clay charges of different size and shape from a plurality of clay slugs and charging a multiple of the said molds therewith at substantially the same time, fabricating the charges thus deposited into ware, and thereafter drying the same while maintaining the group relationship of the molds.

46. In the mechanical automatic manufacture of pottery ware on molds, the method which comprises circulating a plurality of molds in an endless path to and through a mold filling zone, fabrication and drying zone, respectively, equalizing the temperature of the clay and mold, fabricating the clay into ware, and thereafter drying the same.

47. In the automatic mechanical manufacture of pottery ware on absorbent molds, the method which comprises circulating a plurality of molds in an endless path to and through a zone of clay fabrication thereon and drying respectively, equalizing the temperature of the mold and clay prior to fabrication, applying the clay to the mold, fabricating the clay into ware thereon, and thereafter drying the same.

48. An installation for the manufacture of pottery ware which comprises, in combination, a drier, a conveyor operating at least in part in said drier, a pottery ware fabricating machine associated with and operating in timed relation with said conveyor, a plurality of molds on which ware is automatically fabricated by said pottery machine carried by said conveyor, said pottery machine including means for forming and segregating clay charges from elongated slugs of clay, means for applying said clay to said molds, means for profiling said clay, means for lubricating said clay incident to profiling, means for extruding the excess material to a predetermined point of deposit, means for trimming said clay, and means for moving said molds as required to preform the various fabricating operations aforementioned.

49. In the manufacture of pottery ware a method which comprises equalizing the temperature of clay which is to be jiggered on a porous mold to the temperature of such mold prior to its application thereto.

50. In the manufacture of pottery ware the method which comprises, batting out on the mold plastic clay preheated to substantially the temperature of the mold and then jiggering the clay on the mold whilst the clay and mold are at substantially equal temperature.

51. In the manufacture of pottery ware the method which comprises, extruding a heated clay mass containing a multiple of mold charges and then reducing the mass to individual charges before the clay cools, batting out the charges in a heated state directly on porous molds and thereafter jiggering the heated charges, the temperature of the clay and molds being equalized as nearly as possible incident to batting out of the clay on the molds.

52. The process of making pottery ware which consists in circulating a group of porous molds in endless repeated cycles through a mold charging station and a dryer, returning the molds from dryer to the charging station in a heated condition and charging the molds thereat with clay heated to a temperature substantially equal to that of the molds.

53. The process of making pottery ware which consists in circulating a group of porous molds of diverse form in endless repeated cycles through a mold charging station and dryer, returning the molds directly upon emergence from the dryer and while still in a heated condition directly to the charging station and there charging the molds with heated clay in a volume as required by each mold, jiggering the clay into pieces of diverse form whilst in a heated condition and thereafter drying the same.

54. The process of manufacturing jiggered dinnerware which consists in commencing the thermal dehydration of a clay mass before or incident to jiggering by raising the temperature of the clay mass prior to jiggering and then continuing dehydration subsequent to jiggering in an atmosphere of the same or greater temperature value.

55. Apparatus for the manufacture of pottery ware on porous molds comprising, in combination, a mold charging apparatus including a plurality of charge segregating units, a plurality of jiggering units located adjacent thereto, a dryer, means for extruding clay at a temperature substantially equal to that of the molds on which the clay is to be jiggered, means for feeding the clay thus extruded into said mold charging apparatus and mold conveying means for traveling molds to said charge segregating units for filling with heated clay said last named means being operable for transportation of said molds immediately on filling to said jiggering apparatus for jiggering the clay whilst in a heated state and then through the dryer.

56. Apparatus for the manufacture of pottery ware comprising, in combination, a jiggering means and a mold charging unit, said mold charging unit including a means for applying clay to molds, a mold conveyor, a mold supporting chuck mounted below said unit, means for raising and lowering the chuck including a toggle the knee of which when straightened rigidly supports the chuck whilst the mold is co-operated with the clay applying means.

57. In apparatus of the class specified, in combination, means for charging molds with clay, means for feeding clay slugs thereto, means for jiggering said clay, a mold chuck associated with said charging means and said jiggering means, means for elevating and lowering said chucks including a cam and toggle mechanism, means for rotating said jigger chuck and means for synchronizing the periods of rotation of said chuck with the elevation thereof.

58. A pottery machine comprising, in combination, a mold charging apparatus, means for feeding clay slugs thereto, means for batting out clay on molds, a jiggering apparatus, means for co-operating molds with said charging apparatus said batting out apparatus and said jiggering means, a mold conveyor means for applying suction to said molds incident to removal thereof from the conveyor and co-operation with said mold charging apparatus, said batting out means and said jiggering means and means for timing the application and release of suction incidental to the elevation of said molds.

59. A pottery machine comprising, in combination, a mold charging means, means for feeding clay slugs thereto, means for batting out clay on molds and a jiggering means, means for co-operating molds therewith, periodically operating means for applying suction to said molds incident to such co-operation, means for controlling the application of suction and means for periodically transferring molds from said mold charging apparatus to said jiggering means.

60. A pottery machine comprising, in combination, a mold charging apparatus, means for feeding clay slugs thereto, means for batting out clay on molds, a jiggering means, means for co-operating molds therewith, means for applying suction to said molds incident to such co-operation, a plurality of fluid jets associated with said jiggering means and means for controlling the actuation of said fluid jets incident to the elevation of said mold co-operating means.

61. A pottery machine comprising, in combination, a dryer, a mold charging apparatus, means for feeding clay slugs thereto, means for batting out clay on molds, a jiggering apparatus, a chain conveyor having a multiple of molds disposed thereon, elevatable means for removing molds therefrom and moving the same into co-operation with said mold charging apparatus and said jigger respectively, releasable means for temporarily gripping said molds to said mold removing means, means for controlling the operation of said last named means incident to the elevation of said mold removing means, said molds being replaced on said conveyor when charged and jiggered and then conveyed through said dryer.

62. A pottery machine comprising, in combination, a mold charging apparatus, means for feeding clay slugs thereto, means for batting out clay on molds, and a jiggering means, said jiggering means including a profile, means for co-operating molds therewith and releasable means associated therewith for applying suction to said molds, a trimmer and actuating means therefor, means for rotating molds incident to jiggering, means for applying fluid to molds, and means for operating said trimmer, mold rotating and fluid applying means incident to cooperation of the molds with the profile.

63. A pottery machine comprising, in combination, a plurality of mold charging devices, means for feeding slugs thereto, means for operating all the said devices in unison, a plurality of means for batting out the clay on molds, a plurality of mold chucks for co-operating molds therewith, means for applying suction to said molds incident to co-operation with said chucks, a plurality of jiggering apparatus including such auxiliary instrumentalities as trimmers and fluid applying mechanisms, a plurality of chucks for co-operating molds with said jiggering apparatus, means for rotating said molds and means for actuating said auxiliary instrumentalities at predetermined instants and in proper sequence to provide for the jiggering, lubrication, trimming and completion of ware within the period said molds are elevated in co-operation with the jiggering apparatus.

64. A machine for manufacturing pottery ware comprising, in combination, a frame, a mold charging apparatus, a slug feeder associated therewith, jiggering means, means for co-operating molds therewith, a cam shaft, cams mounted on said shaft, drive connections from said cams to said feeding means, mold charging and jiggering means, and instrumentalities for adjusting said cams to vary the operation of said slug feeding means, mold charging and jiggering means.

65. In a machine for manufacturing pottery ware wherein molds are automatically conveyed to and from automatic mold lifters which co-operate the molds in successive order with mold charging apparatus, a drive system for transmitting motion to the various instrumentalities for preforming the aforesaid operations which comprises a cam shaft, a plurality of cams mounted thereon, means for transmitting motion from said cams to the various operating mechanisms in the pottery machine, drive means for said shaft and a torque stabilizer for said shaft operable in response to variations in the turning moment.

66. In a machine for manufacturing pottery ware the combination which comprises, a mold charging apparatus, means for feeding said apparatus with clay slugs, means for co-operating molds therewith, fabricating means, means for co-operating molds with said fabricating means including a chuck, a drive spindle, means for adjusting said chuck angularly with relation to the spindle, means for locking said chuck and spindle against relative rotation, and means for rotating said spindle.

67. In a machine for manufacturing pottery ware, the combination which comprises a mold charging apparatus, means for feeding clay slugs into said apparatus, jiggering means, means for co-operating molds with said jiggering means and said mold charging apparatus said means comprising a mold chuck, a support therefor, means for adjusting the chuck relative to said support to control the thickness of the bat and/or ware, means for elevating and lowering said chuck and means for transporting molds between chucks.

68. A machine for manufacturing pottery ware comprising, in combination, a frame, a plurality of mold charging apparatus mounted thereon, means for feeding slugs of clay to said mold charging apparatus, means enabling the adjustment of any one of said mold charging apparatus together with its feeder on said frame, a plurality of jiggering means mounted in spaced relation and aligned with and spaced with respect to said mold charging apparatus, means enabling the adjustment of said jiggering means relative to one another so that any pair of mold charging apparatus and jiggering means may be aligned on said frame, a conveyor for molds mounted below said jiggering means and said mold charging apparatus, individual mold supports associated with said conveyor, means enabling the adjustment of said mold supports relative to said conveyor and to said mold charging and jiggering apparatus.

69. A machine for manufacturing pottery ware comprising, in combination, a frame, a plurality of slug feeders and mold charging apparatus adjustably mounted on said frame whereby each apparatus may be centered relative to a line of molds, a plurality of jiggering means adjustably mounted on said frame whereby said jiggering means may be centered relative to said lines of molds and said mold charging apparatus, means for conveying molds in rows, means for adjusting the spacing between rows and means for co-operating such molds with said mold charging apparatus and said jiggering means.

70. Apparatus for fabricating pottery ware, comprising, a dryer, a series of mold charging units mounted in co-operative relation therewith, means for feeding clay slugs to said mold charging units, reciprocal chucks and actuating mechanism therefor mounted in line with and below the mold charging units, a multiple of open bottom trays linked in series in an endless flexible chain conveyor, a plurality of jiggering means, means for advancing the trays successively in a substantially rectilinear plane between the mold charging means, the jiggering means and chucks, the jiggering means comprising attachments adapted for differently shaped articles of ware so that one or a multiple of attachments may be used for co-operation with the molds moving in line thereunder.

71. Apparatus for the manufacture of pottery ware comprising, in combination, a machine including a plurality of mold charging apparatus, a plurality of jiggering apparatus, means for transporting molds to the charging apparatus for filling and to the jiggering apparatus for profiling, and means for feeding said charging apparatus with clay including an extruding machine and a plurality of conveyors leading from said machine to said mold charging apparatus.

72. Apparatus for the manufacture of pottery ware comprising, in combination, a mold charging apparatus including a plurality of individual segregating units, means for operating all of said segregating units in unison, a plurality of jiggering units, means for operating all of said jiggering units in unison, means for conveying molds to said mold charging apparatus for filling and then to said jigger apparatus for jiggering and means for feeding clay to said segregating units comprising a conveyor associated with each unit and an extruding device associated with each conveyor.

73. A straight line production system for the manufacture of pottery which comprises, in combination, with a mold conveyor by means of which molds are transported along the system, a mold charging station, a clay jiggering station where diversiform ware is jiggered in multiple, a dryer where the previously jiggered clay is dehydrated, and a subsidiary dryer for laying to dehydrated ware and a ware stripping station.

74. Apparatus for the mass production of pottery ware comprising, in combination, an endless conveyor, mold supports attached thereto, molds carried by said supports and arranged in lines in the direction of travel of said conveyor, drive means for said conveyor, a station where clay is applied to said molds for each line of molds including an individual mold charging unit for each line and means common to all of the units for preparing clay slugs therefor together with means for feeding slugs to said units, a jiggering station for each line of molds where the clay is formed into ware, a dryer common to all lines of molds and through which said supports and molds are travelled and a ware stripping station common to all lines of molds.

75. A machine for the diversified mass production of pottery ware shapes which comprises, a conveyor having a multiple of mold supports on which molds for making different kinds of ware are disposed together with a dryer through which the conveyor travels and a mechanism for filling the molds with clay said mechanism comprising a slug feeding apparatus having a plurality of slug conveying belts associated therewith, each belt having a cutting device located at one end thereof, a jiggering apparatus comprising a plurality of means for profiling, trimming and lubricating the surface of the clay and means associated with said charging apparatus and said jiggering apparatus for lifting the molds off the conveyor into co-operation with said mold charging and jiggering apparatus.

WILLIAM J. MILLER.